US011394344B2

(12) United States Patent
Perkins et al.

(10) Patent No.: US 11,394,344 B2
(45) Date of Patent: Jul. 19, 2022

(54) ROOF MOUNTED PHOTOVOLTAIC SYSTEM AND METHOD FOR WIRELESS TRANSFER OF ELECTRICAL ENERGY

(71) Applicant: GAF Energy LLC, Parsippany, NJ (US)

(72) Inventors: Richard Perkins, San Jose, CA (US); Babak Farhangi, Kew Gardens Hills, NY (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/235,366

(22) Filed: Apr. 20, 2021

(65) Prior Publication Data

US 2022/0052638 A1 Feb. 17, 2022

Related U.S. Application Data

(60) Provisional application No. 63/064,255, filed on Aug. 11, 2020.

(51) Int. Cl.
*H02S 40/30* (2014.01)
*H02J 50/40* (2016.01)
(Continued)

(52) U.S. Cl.
CPC .............. *H02S 40/30* (2014.12); *H02J 50/12* (2016.02); *H02J 50/40* (2016.02); *H02S 20/23* (2014.12); *H02J 3/381* (2013.01); *H02J 2300/24* (2020.01)

(58) Field of Classification Search
CPC .......... H02S 40/32; H02S 40/34; H02S 40/36; H02S 40/38; H02S 20/23-25;
(Continued)

(56) References Cited

U.S. PATENT DOCUMENTS 6,336,304 B1 1/2002 Mimura et al.
7,587,864 B2 9/2009 McCaskill et al.
(Continued)

FOREIGN PATENT DOCUMENTS

CA 2829440 A1 4/2014
WO 2011/049944 A1 4/2011
WO WO2019208887 A1 * 10/2019 .............. H02J 50/12

OTHER PUBLICATIONS

"Types of Roofing Underlayment", Apr. 26, 2020, Owens Corning, date available via Google at <https://www.owenscorning.com/en-us/roofing/tools/how-roofing-underlayment-helps-protect-your-home>. (Year: 2020).*
(Continued)

*Primary Examiner* — Rexford N Barnie
*Assistant Examiner* — David A Shiao
(74) *Attorney, Agent, or Firm* — Greenberg Traurig, LLP

(57) ABSTRACT

A roof mountable photovoltaic system, wherein electrical energy is transferred from multiple direct current generating sources to at least one wireless energy receiver device through some separated distance. The system is configured such that electrical energy can be transferred even through an obstruction, such as several layers of roofing material, to the wireless energy receiver device. In some embodiments, there are fewer wireless energy receiver devices than the direct current generating sources. In some embodiments, the wireless energy receiver device can include one or more inductive windings, antennae, or a combination thereof, which can couple with the windings, antennae, or a combination thereof of the wireless transmitter(s) to transfer electrical energy from the transmitters to the one or more receivers without direct electrical or physical connection.

18 Claims, 8 Drawing Sheets

(51) Int. Cl.
*H02S 20/23* (2014.01)
*H02J 50/12* (2016.01)
*H02J 3/38* (2006.01)

(58) Field of Classification Search
CPC ....... H02S 40/30–38; H02J 7/00; H02J 7/025; H02J 7/02; H02J 50/12; H02J 50/60; H02J 50/80; H02J 50/90; H02J 50/10–12; H02J 50/40–402; H02J 2300/24–26; H02J 3/381; H01F 38/14; Y02B 10/10; Y02E 10/50–56
USPC .......................................................... 52/173.3
See application file for complete search history.

(56) References Cited

U.S. PATENT DOCUMENTS 7,666,491 B2 2/2010 Yang et al.
7,678,990 B2 3/2010 McCaskill et al.
7,678,991 B2 3/2010 McCaskill et al.
7,819,114 B2 10/2010 Augenbraun et al.
7,824,191 B1 11/2010 Browder
7,832,176 B2 11/2010 McCaskill et al.
8,371,076 B2 2/2013 Jones et al.
8,468,754 B2 6/2013 Railkar et al.
8,505,249 B2 8/2013 Geary
8,512,866 B2 8/2013 Taylor
8,623,499 B2 1/2014 Viasnoff
8,629,578 B2 * 1/2014 Kurs ....................... H02J 7/025 307/104
8,713,860 B2 5/2014 Railkar et al.
8,742,620 B1 * 6/2014 Brennan ................. H02J 3/381 307/59
8,925,262 B2 1/2015 Railkar et al.
8,946,938 B2 * 2/2015 Kesler ................... H02J 7/0047 307/104
8,994,224 B2 3/2015 Mehta et al.
9,035,499 B2 5/2015 Campanella et al.
9,145,498 B2 9/2015 Ultsch
9,169,646 B2 10/2015 Rodrigues et al.
9,171,991 B2 10/2015 Pearce
9,273,885 B2 3/2016 Rodrigues et al.
9,670,353 B2 6/2017 Peng et al.
9,711,672 B2 7/2017 Wang
9,912,284 B2 3/2018 Svec
9,920,515 B2 3/2018 Xing et al.
9,923,515 B2 3/2018 Rodrigues et al.
9,987,786 B2 6/2018 Stoiljkovic et al.
9,991,412 B2 6/2018 Gonzalez et al.
10,015,933 B2 7/2018 Boldrin
10,027,273 B2 7/2018 West et al.
10,097,011 B2 10/2018 Kesler et al.
10,115,850 B2 10/2018 Rodrigues et al.
10,128,660 B1 * 11/2018 Apte ....................... H02J 3/472
10,179,852 B2 1/2019 Gossi et al.
10,187,005 B2 1/2019 Rodrigues et al.
10,256,765 B2 4/2019 Rodrigues et al.
10,480,192 B2 11/2019 Xing et al.
10,669,414 B2 6/2020 Li et al.
10,907,355 B2 2/2021 Hubbard et al.
10,914,063 B2 2/2021 Lee et al.
RE48,555 E 5/2021 Cancio et al.
11,015,085 B2 5/2021 Bruns et al.
11,065,849 B2 7/2021 Ackermann et al.
2002/0053360 A1 5/2002 Kinoshita et al.
2002/0102422 A1 8/2002 Hubbard et al.
2002/0129849 A1 9/2002 Heckeroth
2003/0217768 A1 11/2003 Guha
2005/0115603 A1 6/2005 Yoshida et al.
2005/0144870 A1 7/2005 Dinwoodie
2006/0042683 A1 3/2006 Gangemi
2008/0006323 A1 1/2008 Kalkanoglu et al.
2009/0114261 A1 5/2009 Stancel et al.
2009/0159118 A1 6/2009 Kalkanoglu
2009/0229652 A1 9/2009 Maple et al.
2010/0101634 A1 4/2010 Frank et al.
2010/0187912 A1 * 7/2010 Kitamura ................ H02J 50/90 307/104
2010/0219694 A1 * 9/2010 Kurs ....................... H02J 50/50 307/104
2010/0313499 A1 12/2010 Gangemi
2010/0326488 A1 12/2010 Aue et al.
2011/0030761 A1 2/2011 Kalkanoglu et al.
2011/0036386 A1 2/2011 Browder
2011/0037322 A1 * 2/2011 Kanno .................... H02J 7/025 307/104
2011/0048507 A1 3/2011 Livsey et al.
2011/0058337 A1 3/2011 Han
2011/0132427 A1 6/2011 Kalkanoglu et al.
2011/0302859 A1 12/2011 Crasnianski
2012/0057322 A1 * 3/2012 Waffenschmidt ....... H02J 50/10 361/816
2012/0098350 A1 * 4/2012 Campanella ............ B60L 53/51 307/104
2012/0098485 A1 * 4/2012 Kang ...................... H02J 50/10 320/108
2012/0212065 A1 8/2012 Cheng et al.
2012/0233940 A1 9/2012 Perkins
2012/0240490 A1 9/2012 Gangemi
2013/0014455 A1 1/2013 Grieco
2013/0099587 A1 * 4/2013 Lou ......................... H02J 3/381 307/104
2013/0127257 A1 * 5/2013 Yamamoto ................ H02J 4/00 307/104
2013/0175937 A1 * 7/2013 Nakajo .................. H05B 47/10 315/276
2013/0193769 A1 * 8/2013 Mehta ..................... H02J 50/90 307/104
2013/0255755 A1 * 10/2013 Chich ..................... H02S 40/32 136/251
2014/0260001 A1 9/2014 Kiik et al.
2014/0352760 A1 * 12/2014 Haynes ..................... H02J 3/38 136/246
2015/0024159 A1 1/2015 Bess et al.
2015/0221785 A1 * 8/2015 Cheng ..................... H02J 50/12 136/244
2016/0012962 A1 * 1/2016 Lee ......................... H01L 24/00 336/192
2016/0072301 A1 3/2016 Maniktala
2016/0359451 A1 12/2016 Mao et al.
2017/0005528 A1 * 1/2017 Oodachi ................. H02J 50/20
2017/0159292 A1 6/2017 Chihlas et al.
2017/0179726 A1 * 6/2017 Garrity ................. H02J 7/0045
2017/0203555 A1 7/2017 Wang et al.
2018/0094438 A1 4/2018 Wu et al.
2018/0094439 A1 4/2018 Wang et al.
2018/0123503 A1 5/2018 Haynes et al.
2018/0205263 A1 7/2018 von Novak, III
2018/0281347 A1 10/2018 Gossi
2019/0370427 A1 12/2019 Lee et al.
2020/0020819 A1 1/2020 Farhangi
2020/0224419 A1 7/2020 Boss et al.
2021/0002898 A1 1/2021 Knebel et al.
2021/0095474 A1 4/2021 Yang et al.
2021/0113970 A1 4/2021 Stainer et al.
2021/0171808 A1 6/2021 Ackermann et al.
2021/0172174 A1 6/2021 Ackermann et al.

OTHER PUBLICATIONS

"Wireless power transfer", Aug. 3, 2020, Wikipedia, retrieved via Wayback Machine at <https://web.archive.org/web/20200803124718/https://en.wikipedia.org/wiki/Wireless_power_transfer>. (Year: 2020).*
Heo et al., Development and Application of Wireless Power Transmission Systems for Wireless ECG Sensors, In: Hindawi, Journal of Sensors, vol. 2018, [online] Feb. 12, 2018, [retrieved on Jul. 12, 2017]. Retrieved from the Internet: <URL: https://www.hindawi.com/journals/js/2018/5831056/>.
Han, Wireless Interconnect using Inductive Coupling in 3D-ICs, A dissertation submitted in partial fulfillment of the requirements for the degree of Doctor of Philosophy in The University of Michigan,

(56) References Cited

OTHER PUBLICATIONS

[online] 2012, [retrieved on Jul. 12, 2017]. Retrieved from the Internet: <URL: http://hdl.handle.net/2027.42/94034>.

* cited by examiner

ROOF MOUNTED PHOTOVOLTAIC SYSTEM AND METHOD FOR WIRELESS TRANSFER OF ELECTRICAL ENERGY

RELATED APPLICATIONS

This application claims the benefit of priority to U.S. Provisional Patent Application Ser. No. 63/064,255 filed on Aug. 11, 2020, the entirety of which is incorporated by reference herein.

FIELD OF THE TECHNOLOGY

This disclosure relates generally to roof mounted photovoltaic systems and methods for wireless transfer of electrical energy from solar modules and arrays to physically separated receivers.

BACKGROUND

Roof integrated photovoltaic (RIPV) systems generally transfer electricity from a solar module to another solar module and then through conductive cables that enter the building roof structure via a hole or equivalent. These cables can be interconnected with, for example, Multilam connectors. Multilam connectors are heavily engineered. A typical RIPV system can require many holes through the building roof structure and also many Multiam connectors.

SUMMARY

In some embodiments, a roof mountable photovoltaic system is disclosed. In some embodiments, the roof mountable photovoltaic system is configured to transfer electrical energy from multiple independent solar modules through the air or through an obstruction (such as for example several layers of roofing material or structure) to at least one wireless energy receiver device.

In some embodiments of the roof mountable photovoltaic systems do not include electric cables and electrical connectors for connecting the multiple independent solar modules to electric circuits of a building structure.

In some embodiments, a roofing system comprises a roof structure including a roof deck; at least two photovoltaic devices disposed above the roof deck, wherein each of the at least two photovoltaic devices includes at least one solar cell, and at least one wireless energy transmitter device, wherein the at least one wireless energy transmitter device is electrically connected to the at least one solar cell, wherein each of the at least one wireless energy transmitter device is configured, when in operation, to generate an alternating magnetic field; and at least one wireless energy receiver device, wherein the at least one wireless energy receiver device is not in direct electrical contact with the at least two photovoltaic devices, wherein each of the at least one wireless energy receiver device includes an electrical circuit, and at least one magnetic induction component in electrical contact with the electrical circuit, wherein each of the at least one magnetic induction component is configured, when in operation, to be inductively coupled to the at least one wireless energy transmitter device to alter a current through the electrical circuit.

In some embodiments of the roofing system, a quantity of the at least one wireless energy receiver device is fewer than a quantity of the at least two photovoltaic devices.

In some embodiments of the roofing system, a quantity of the at least one magnetic induction component is fewer than a quantity of the at least one wireless energy transmitter device.

In some embodiments of the roofing system, a quantity of the at least one wireless energy receiver device is fewer than a quantity of the at least one solar cell.

In some embodiments of the roofing system, a quantity of the at least one magnetic induction component is fewer than a quantity of the at least one solar cell.

In some embodiments of the roofing system, the at least two photovoltaic devices are not directly in electrical contact with each other.

In some embodiments of the roofing system, the at least one wireless energy receiver device is a plurality of wireless energy receiver devices.

In some embodiments of the roofing system, the at least one wireless energy receiver device is one wireless energy receiver device.

In some embodiments of the roofing system, the at least one wireless energy receiver device is a plurality of wireless energy receiver devices.

In some embodiments of the roofing system, the roof structure further comprises a shingle; an underlayment; wherein the underlayment is disposed between the shingle and the roof deck; and an underside of the roof deck.

In some embodiments of the roofing system, the at least one wireless energy receiver device is disposed below the underlayment.

In some embodiments of the roofing system, the at least one wireless energy receiver device disposed below the underside of the roof deck.

In some embodiments of the roofing system, the underside of the roof deck is in an attic of a building structure.

In some embodiments of the roofing system, the at least one magnetic induction component of the at least one wireless energy receiver device is disposed below the underlayment.

In some embodiments of the roofing system, the underlayment includes a surface that faces the roof deck, and the at least one magnetic induction component is disposed on said surface.

In some embodiments of the roofing system, the at least one magnetic induction component includes at least one metal foil.

In some embodiments of the roofing system, the inductive coupling of the at least one magnetic induction component is via electromotive force due to the magnetic field when in operation.

In some embodiments of the roofing system, each of the at least one photovoltaic device further comprises an inverter configured, when in operation, to generate high frequency alternating current (AC).

In some embodiments of the roofing system, each of the at least one photovoltaic device further comprises a resonant network of discrete or integrated components electrically connected to the at least one wireless energy transmitter device.

In some embodiments of the roofing system, the electrical circuit of each of the at least one wireless energy receiver device comprises a receiver resonant network of discrete or integrated components electrically connected to the at least one magnetic induction component.

In some embodiments of the roofing system, the wireless energy transmitter device comprises a resonant power converter; a capacitor, an inductor, or a combination thereof; and an inverter.

In some embodiments of the roofing system, the at least one photovoltaic device is not connected electrically to a household appliance.

In some embodiments, a roof system comprises at least one photovoltaic device disposed above a roof deck, wherein each of the at least one photovoltaic device includes at least one solar cell, and at least one wireless energy transmitter device, wherein the at least one wireless energy transmitter device is electrically connected to the at least one solar cell, wherein each of the at least one wireless energy transmitter device is configured, when in operation, to alter a magnetic field; at least one wireless energy receiver device disposed below the at least one photovoltaic device, wherein the at least one wireless energy receiver device is not in direct electrical contact with the at least one photovoltaic device, wherein each of the at least one wireless energy receiver device includes an electrical circuit, and at least one magnetic induction component in electrical contact with the electrical circuit, wherein each of the at least one magnetic induction component is configured, when in operation, to be inductively coupled to the at least one wireless energy transmitter device to alter a current through the electrical circuit.

In some embodiments, a system comprises at least one photovoltaic device, wherein each of the at least one photovoltaic device includes at least one solar cell, and at least one wireless energy transmitter device, wherein the at least one wireless energy transmitter device is electrically connected to the at least one solar cell, wherein each of the at least one wireless energy transmitter device is configured, when in operation, to alter a magnetic field; and at least one wireless energy receiver device, wherein the at least one wireless energy receiver device is not in direct electrical contact with the at least one photovoltaic device, wherein each of the at least one wireless energy receiver device includes an electrical circuit, and at least one magnetic induction component in electrical contact with the electrical circuit, wherein each of the at least one magnetic induction component is configured, when in operation, to be inductively coupled to the at least one wireless energy transmitter device to alter a current through the electrical circuit.

In some embodiments, a quantity of the at least one wireless energy receiver device is fewer than a quantity of the at least two photovoltaic devices.

In some embodiments, a quantity of the at least one magnetic induction component is fewer than a quantity of the at least one wireless energy transmitter device.

In some embodiments, a quantity of the at least one wireless energy receiver device is fewer than a quantity of the at least one solar cell.

In some embodiments, a quantity of the at least one magnetic induction component is fewer than a quantity of the at least one solar cell.

BRIEF DESCRIPTION OF THE DRAWINGS

References are made to the accompanying drawings, which form a part of this disclosure, and which illustrate examples of the systems and methods described herein. Like reference numbers represent like parts throughout.

Figure 1:
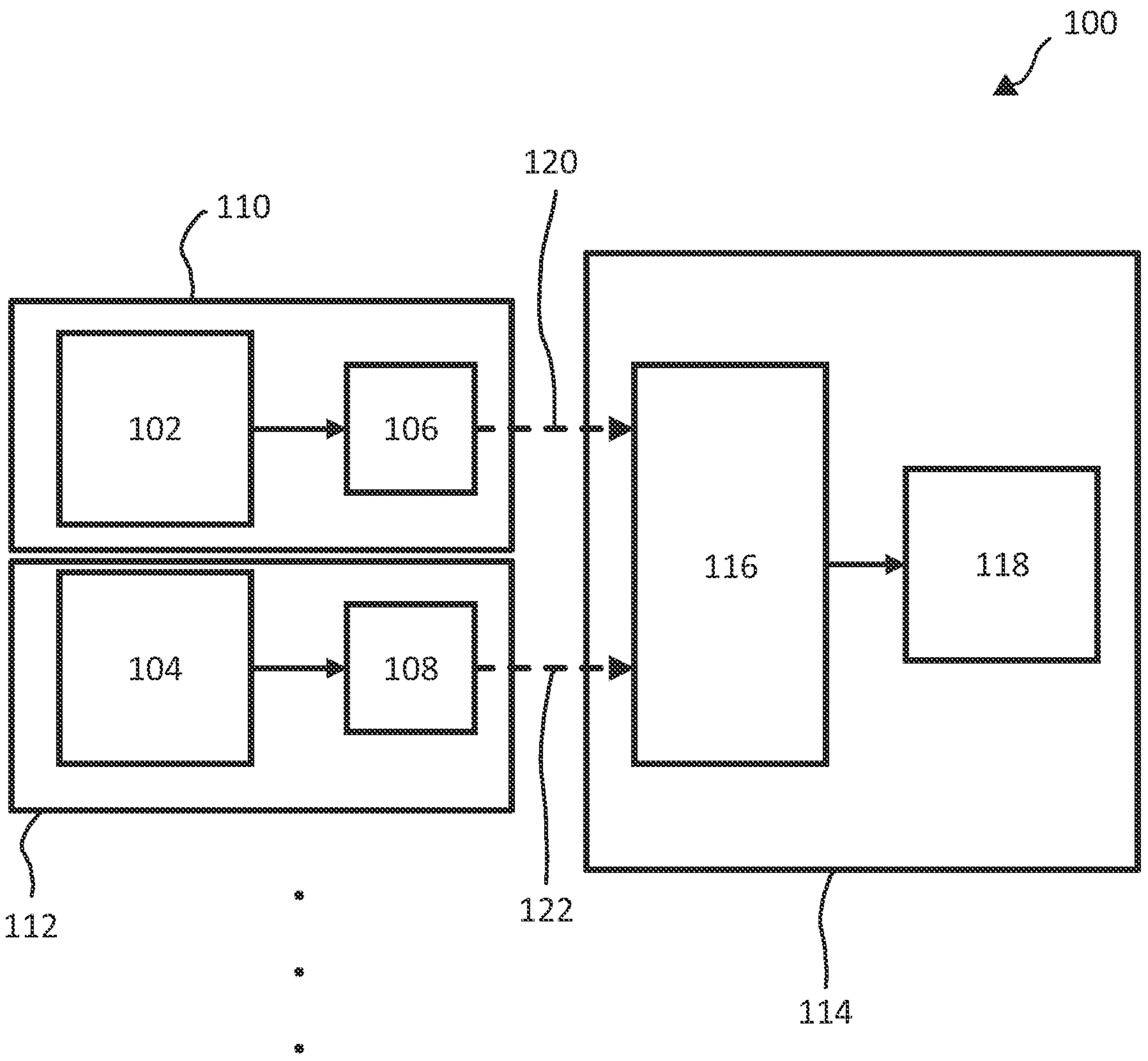
FIG. 1 is a schematic diagram of an embodiment of a photovoltaic system.

"AC" used herein is an alternating current. "AC-to-AC converter" is used herein as a type of converter which alters a source AC waveform to a different output AC waveform, wherein an output AC waveform can have an output voltage, current, and frequency (or period) that is different from the source AC waveform.

"Capacitive coupling" is used herein as a transfer of energy within an electrical network or between distant and separate electrical networks by a displacement current between circuit nodes induced by an electric field. "Converter" is used herein as a type of an electronic circuit, an electromechanical device, or a component that alters a source electricity to another. Non-limiting examples of a converter include an AC-to-AC converter, a DC-to-DC converter, an AC-to-DC converter, a DC-to-AC converter, a resonant power converter, etc.

"DC" used herein is a direct current. "DC-to-DC converter" is used herein as a type of converter which changes a voltage level of a source DC to a different voltage level for an output DC. "$DC_{input}$" is used herein as a DC voltage, current, or both, measured at an input portion (which can be designated as needed, required, or arbitrarily) of an electronic circuit. Non-limiting examples include the DC voltage measured immediately downstream of an operating solar cell, which measures an amount of electricity being generated by the operating solar cell. "$DC_{output}$" is used herein as a DC voltage, current, or both, measured at an output portion (which can be designated as needed, required, or arbitrarily) of an electronic circuit. Non-limiting examples include the DC voltage measured immediately downstream of a rectifier, which measures an amount of electricity being produced by the circuitry that is upstream of the measured portion of the circuitry. "DC source" is used herein as a device or component that produces or generates electricity as a DC.

"Electrical Resonance" is used herein as a condition when the impedances (or admittances) of circuit elements cancel each other. "Resonance Frequency" is used herein as the frequency that electrical resonance happens at. "Resonant tank" is used herein as an electric circuit including elements that are affected to have the electrical resonance. The resonant tank is formed by elements of coupled transmitter and receiver coils and matching elements employed in the transmitter circuit(s), the receiver circuit(s), or both. "Resonant power converters" is used herein as power converters that operate based on utilizing resonant behaviors and include resonant tanks. "Resonant Inductive Coupling" is used herein as an inductive coupling enhanced with electrical resonance. "Inductive coupling," also known as magnetic coupling, is used herein as a type of interaction among electrical networks, wherein electrical networks are inductively coupled when they are configured such that a change in current through one wire induces a voltage across the ends of the other wire through electromagnetic induction. "Inductor" is used herein as a device or component configured to store energy in a magnetic field when electric current flows through it. "Inverter" is used herein as a DC-to-AC converter, also known as DC-to-AC inverter, or power inverter.

"Magnetic coupling factor" (k) is used herein represents how well coils are magnetically coupled. Range for k is 0 to 1. When k=1, the flux produced by the transmitter coil is completely linked with the receiver coil (e.g., "tightly coupled"); and when k=0, the flux produced by the transmitter coil is not linked at all with the receiver coil (e.g., the coils are magnetically isolated). "Magnetic leakage flux" is used herein as an amount of magnetic field that does not couple with a coil. Magnetic leakage flux is a portion of a magnetic flux which does not follow the particularly intended path in a magnetic circuit. This leakage flux is related to magnetic coupling factor, where a lower value of k can indicate that there is a large magnetic leakage flux.

"Power" (or Electrical Power) is used herein, in relation to a circuit, as a rate at which energy is absorbed or produced within the circuit. Power (P) is the product of voltage and current. Generally, unit of Power is the Watt (W) (i.e., Joule per second (J/s)). "Power capacity" is used herein as the maximum power that may be processed or produced at one instance (generally, the unit for power capacity is the Watt (W)). "Power transfer efficiency" is used herein as, for example, electrical power conversion transfer efficiency. This efficiency is expressed as a percentage and is determined by dividing the output power in watts by the input power in watts and multiplying by 100. "Phase shift" (or phase difference) is used herein, in relation to AC, as an amount (e.g., degrees or radians) that a waveform (AC) has been altered from a certain reference point along, e.g., the horizontal zero axis. A phase shift can be a lateral difference between two or more waveforms (AC) on a common axis. A phase shift can be a degree of change or alteration of an input AC when compared to an output AC.

"Receiver module" as used herein is a device which includes at least a wireless energy receiver device or component, which is configured to be electrically connected to an electric circuitry. "Rectifier" as used herein is an AC-to-DC converter, also known as AC-to-DC rectifier. This conversion is called "rectification" because the process "straightens" (i.e., DC) a waveform (i.e., AC). "Resonant network," also called resonant circuit, as used herein is a combination of electrical components that define a circuit's resonant frequency. "Resonant power converter" as used herein is a type of electric power converter that contains a network of inductors and capacitors called a "resonant tank", tuned to resonate at a specific frequency.

"Solar module," also called photovoltaic device or photovoltaic module, as used herein is a device or component to a device which includes at least one solar cell and circuitry. "Wireless energy transmitter device," also called "transmitter circuitry," as used herein is a device or component to a device which includes a wireless transmitter inductive winding or antenna configured for wireless transmission of energy. "Transmitter module" as used herein includes at least one solar module and at least one transmitter circuitry.

DETAILED DESCRIPTION

FIG. 1 shows a schematic diagram of an embodiment of a photovoltaic system 100. In some embodiments, the photovoltaic system 100 is configured to be attached to a building structure, such as, for example but not limited to, a roof structure of the building. Accordingly, the photovoltaic system 100 is, in some embodiments, a roof mountable photovoltaic system. In some embodiments, the photovoltaic system 100 is mounted on a roof deck.

According to the embodiment depicted in FIG. 1, the photovoltaic system 100 includes at least two solar modules 102, 104. Each of the solar modules 102, 104 are electrically connected to a wireless energy transmitter device 106, 108, respectively. In some embodiments, multiple solar modules can be electrically connected to a single wireless energy transmitter device.

In some embodiments, a transmitter module 110 includes at least one solar module 102 and at least one wireless energy transmitter device 106. In some embodiments, another transmitter module 112 includes at least one solar module 104 and at least one wireless energy transmitter device 108. Accordingly, in some embodiments, the photovoltaic system 100 can have at least two transmitter modules 110, 112.

In some embodiments, as shown in FIG. 1, the photovoltaic system 100 includes a set of components that is a receiver module 114. The receiver module 114 includes a receiver component 116 that is electrically connected to a receiver circuitry 118. In some embodiments, the receiver component 116 includes several coils or windings. In some embodiments, the receiver component 116 includes a single coil or winding. In some embodiments, the quantity of coils or windings in the receiver component 116 equal the quantity of the wireless energy transmitter device 106, 108.

The solar modules 102, 104 operate to receive photons and then generate electrical current. Each of the solar modules 102, 104 provides electricity to the respectively connected wireless energy transmitter devices 106, 108. That is, the solar module 102 provides electricity to the wireless energy transmitter device 106. The solar module 104 provides electricity to the wireless energy transmitter device 108.

Then, the wireless energy transmitter devices 106, 108 transmit energy to the receiver component 116 or provides an energy field(s) 120, 122 which in turn affects the receiver component 116. The affected receiver component 116 then generates an electrical current and provides the receiver circuitry 118 with electricity. In some embodiments, the energy field(s) 120, 122 is(are) magnetic field(s) generated by the wireless energy transmitter devices 106, 108, and the receiver component 116 includes an antenna, windings, or coils that are affected by the magnetic field(s) to generate electricity.

In some embodiments, a quantity of the receiver module 114 is fewer than a quantity of the transmitter modules 110, 112. In some embodiments, a quantity of the receiver component 116 is fewer than a quantity of the wireless energy transmitter device 106, 108. In some embodiments, a quantity of the receiver module 114 is fewer than a quantity of the solar modules 102, 104. In some embodiments, a quantity of the receiver component 116 is fewer than a quantity of the solar modules 102, 104.

In some embodiments, the receiver module 114 is electrically separated from the transmitter modules 110, 112.

In some instances, the transmitter modules 110, 112 are set a distance apart from the receiver module 114. That is, the transmitter modules 110, 112 are not in direct physical contact with the receiver module 114. Further, the transmitter modules 110, 112 are not electrically connected with the receiver module 114.

In some embodiments, the receiver circuitry 118 is electrically connected to other circuits, such as the electrical circuit in the building. In some embodiments, the receiver circuitry 118 is electrically connected to various devices, such as for example but not limited to, lights, appliances, computers, networks, electric vehicles, etc.

According to the embodiment shown in FIG. 1, the transfer of electricity from the transmitter modules 110, 112 to provide electricity to various devices inside the building is performed without requiring connections via conductive cables that run through a hole in a building structure (e.g., roof, wall, etc.). Accordingly, in many embodiments, the deficiencies that arise out of using cables, holes and various connectors are completely eliminated.

Figure 2:
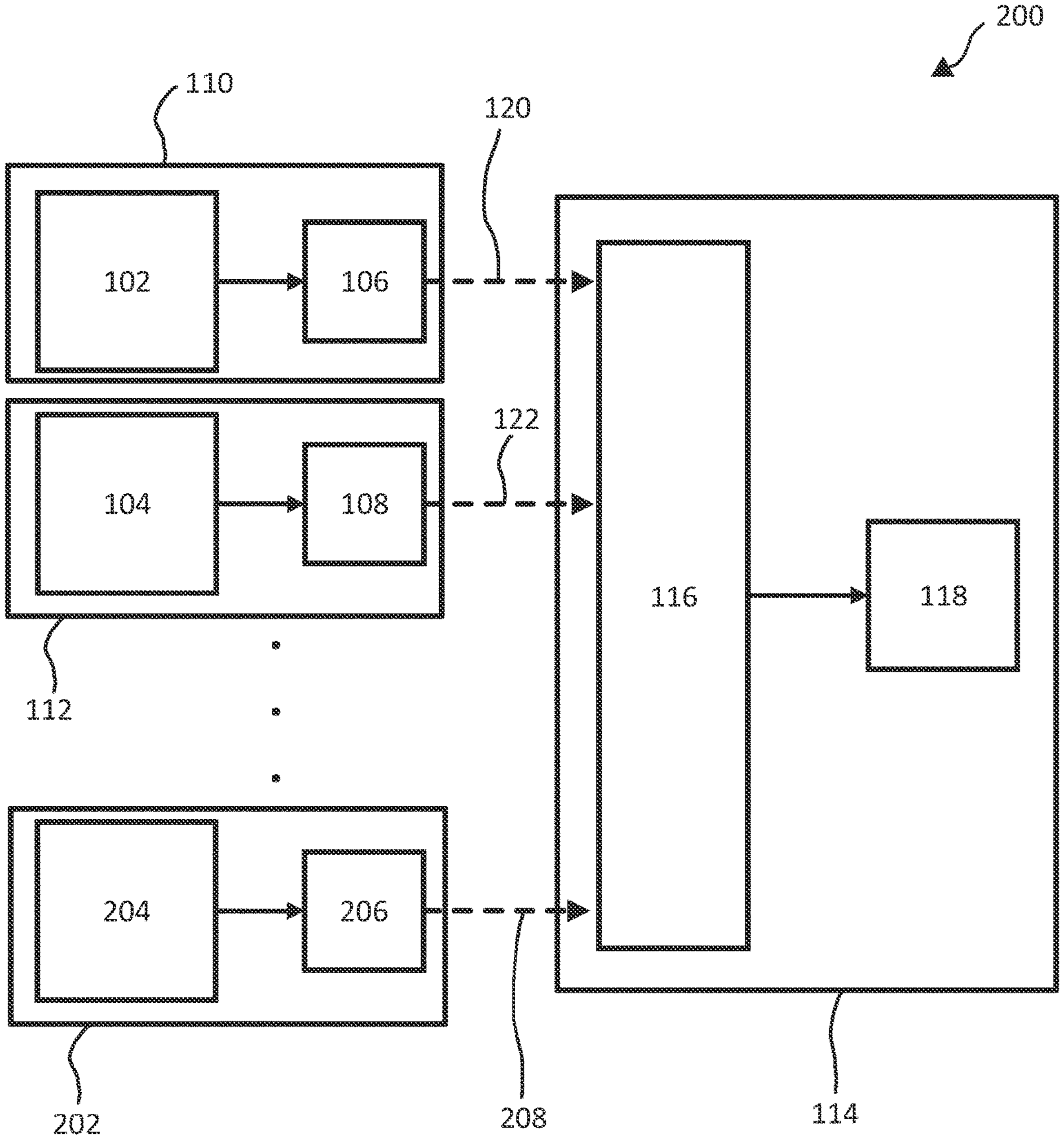
FIG. 2 is a schematic diagram of another embodiment of a photovoltaic system.

FIG. 2 shows another schematic diagram of an embodiment of a photovoltaic system 200, which is similar to the photovoltaic system 100 shown in FIG. 1. In FIG. 2, there is a plurality of transmitter modules 110, 112, 202 such that the quantity of transmitter modules 110, 112, 202 is greater than the quantity of receiver module(s). The transmitter module 202 shown in FIG. 2 includes a solar module 204 and a wireless energy transmitter device 206. In some embodiments, a quantity of transmitter modules 110, 112, 202 is greater than three.

In some embodiments, the photovoltaic system 200 includes multiple solar modules 102, 104, 204. Each of the solar modules 102, 104, 204 are electrically connected to a wireless energy transmitter device 106, 108, 206, respectively.

FIG. 2 also shows an embodiment of the receiver module 114. The receiver module 114 includes, in this embodiment, a receiver component 116 that is electrically connected to a receiver circuitry 118. The receiver module 114 is electrically separated from all of the transmitter modules 110, 112, 202. These transmitter modules 110, 112, 202 are set a distance apart from the receiver module 114, such that the transmitter modules 110, 112, 202 are not in direct physical contact with the receiver module 114. Further, the transmitter modules 110, 112, 202 are not electrically connected with the receiver module 114. In operation, each of the solar modules 102, 104, 204 operate to receive photons and then generate electrical current to provide electricity to each of the wireless energy transmitter devices 106, 108, 206. That is, the solar module 102 provides electricity to the wireless energy transmitter device 106. The solar module 104 provides electricity to the wireless energy transmitter device 108. The solar module 204 provides electricity to the wireless energy transmitter device 206. Then, the wireless energy transmitter devices 106, 108, 206 transmit energy to the receiver component 116 or provides at least one energy field(s) (e.g., magnetic field(s)) 120, 122, 208 which in turn affects the receiver component 116. The affected receiver component 116 generates an electrical current and provides the receiver circuitry 118 with electricity.

In some embodiments, the energy field(s) 120, 122, 208 is(are) magnetic field(s) generated by the wireless energy transmitter devices 106, 108, 206. The receiver component 116 includes at least one antenna, winding, or coil that is affected by the magnetic field(s) 120, 122, 208 to generate electricity.

In some embodiments, there are fewer wire coil(s) in the receiver component 116 than the transmitter coils of the wireless energy transmitter devices 106, 108, 206.

In some embodiments, there is a one-to-one relationship in the number of coils of the receiver component 116 to the number of coils of the wireless energy transmitter devices 106, 108, 206.

In some embodiments, there are more wireless energy transmitter devices 106, 108, 206 than the receiver components 116. In such embodiments, there are several methods of electromagnetic coupling for transmitting power wirelessly. These methods include, for example and not necessarily limited to, capacitive coupling, inductive coupling, resonant inductive coupling, or a combination thereof.

In some embodiments, inductive coupling method is applied. In these embodiments, the wireless energy transmitter devices 106, 108, 206 include inverters to convert DC (sourced from the solar modules 102, 104, 204) to AC. Each of the wireless energy transmitter devices 106, 108, 206 includes at least one coil or antenna, and AC through the coil or antenna generate or affect a magnetic field about the coils or antennas of the wireless energy transmitter devices 106, 108, 206. The receiver component 116 is affected by this magnetic field, which can be an alternating magnetic field.

In some embodiments, resonant inductive coupling method is applied. In these embodiments, the wireless energy transmitter devices 106, 108, 206 include resonant tank(s).

In some embodiments, the inverters operate and are controlled independently. In some embodiments, the frequencies of the inverters can be synchronized with the same frequency. In some embodiments, the frequencies of the inverters operate under a single frequency.

In some embodiments, the coils of the receiver component 116 are electrically connected in series. In some of these embodiments, each of the coils can be called a "segment" of the receiver component 116. In some embodiments, the segment has a width and a length that are not equal. For example, the coil winding making up a particular exemplary segment can have a length that is greater than its height. Further, in some embodiments, the segment can have an average diameter that is the same or smaller than the average diameter of the wireless energy transmitter devices' 106, 108, 206 coils.

In some embodiments, the receiver component's 116 coil(s) covers an area that is greater than the total area of the transmitter's 106, 108, 206 coils. The arrangement, configuration, size, and other properties can affect the uniformity of the magnetic coupling between the transmitter coil(s) and the receiver coil(s).

For example, according to a configuration having two receiver coils connected in series, some amount of misalignment can still achieve acceptable efficiencies.

Figure 3:
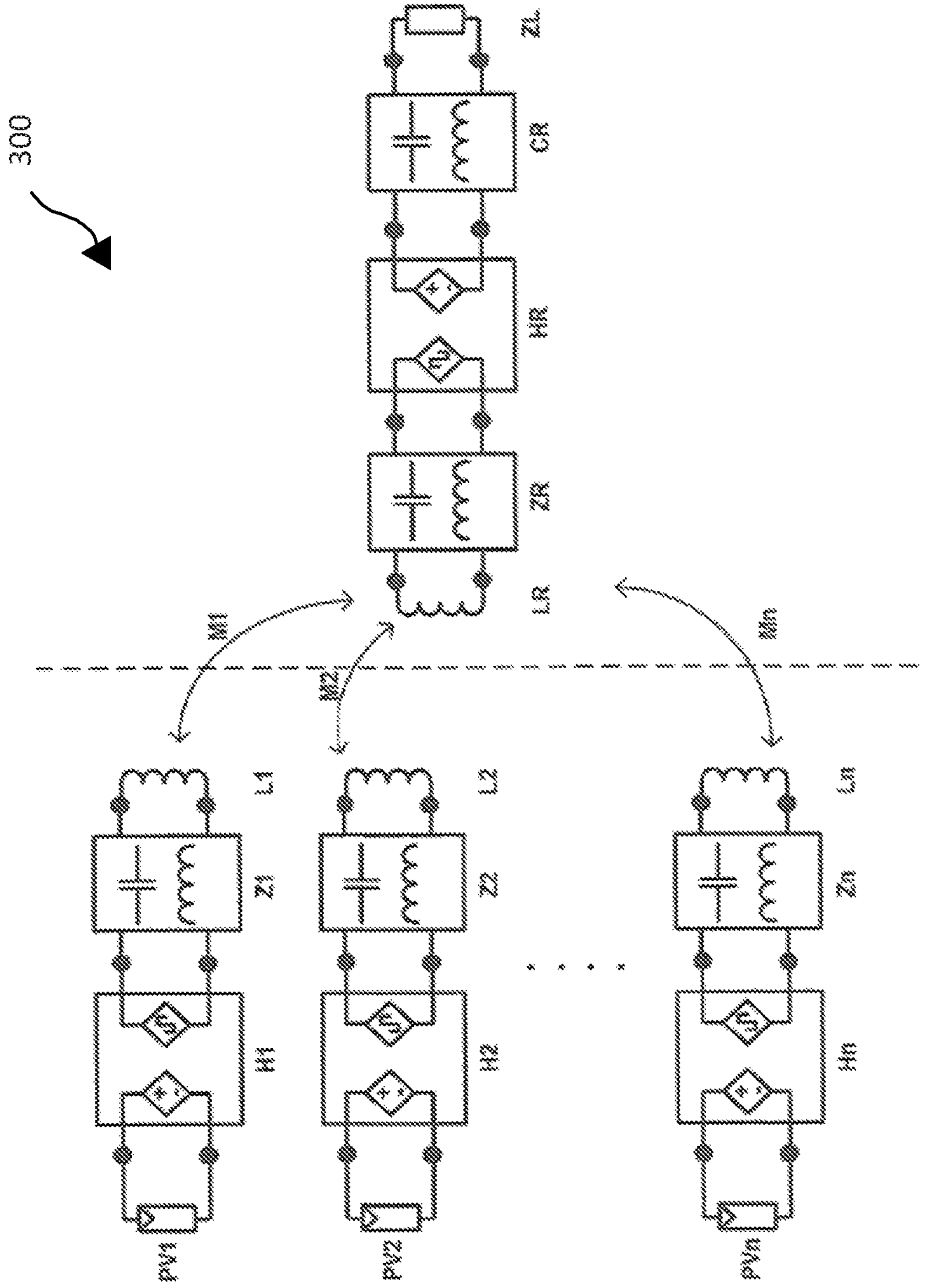
FIG. 3 is a schematic diagram of yet another embodiment of a photovoltaic system.

FIG. 3 shows another schematic diagram according to an embodiment of a photovoltaic system 300, with more details of the circuitry for the components. FIG. 3 shows (and also shown in FIGS. 4 and 6) several photovoltaic modules PV1, PV2, . . . , PVn, wherein each of the photovoltaic modules PV1, PV2, . . . , PVn includes, respectively, inverters H1, H2, . . . , Hn, resonant networks Z1, Z2, . . . , Zn, and transmitter inductive windings or antennae L1, L2, . . . , Ln.

In some embodiments, the receiving side of the schematic diagram shown in FIG. 3 includes a receiver inductive coil, windings, or antenna LR, which is electrically connected to a receiver resonant network ZR, which is electrically connected to a receiver rectifier HR. The circuits of these components can include passive devices such as capacitors, resistors, inductive devices, or any combinations thereof, such that, for example, to handle various tasks such as filtering, and a load ZL.

Figure 4:
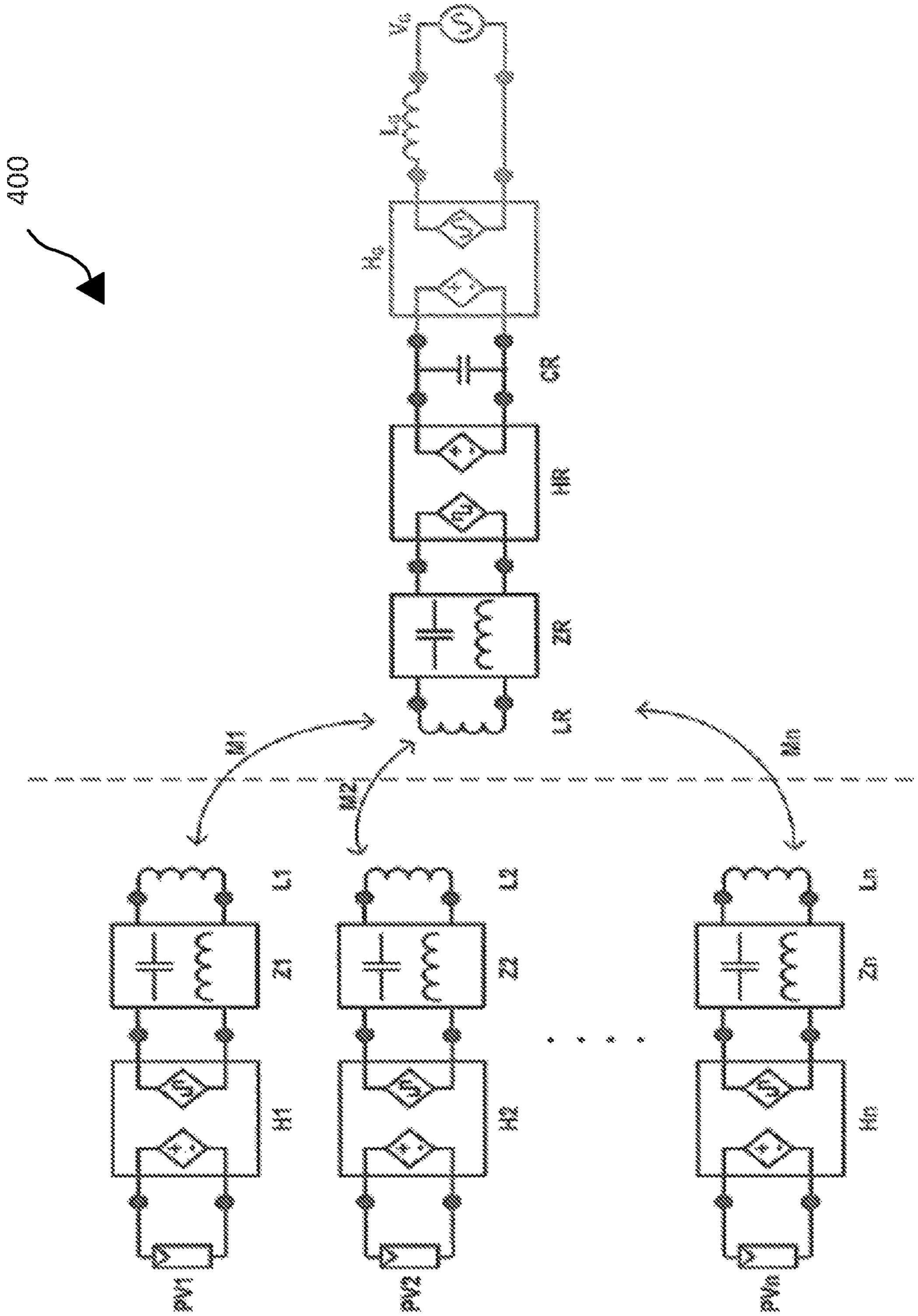
FIG. 4 is a schematic diagram of yet another embodiment of a photovoltaic system.
Figure 6:
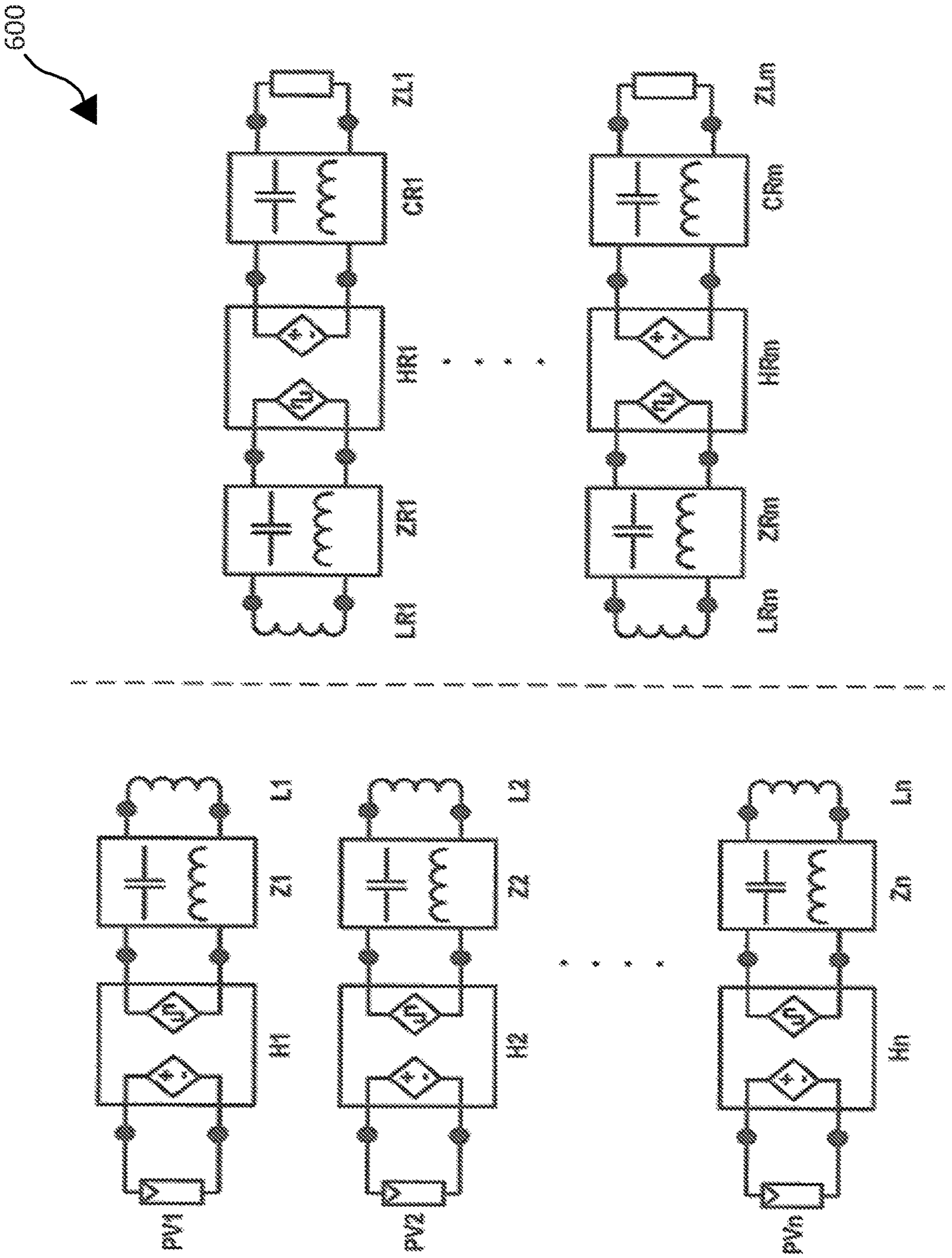
FIG. 6 is a schematic diagram of yet another embodiment of a photovoltaic system.

Further, as shown in FIGS. 3, 4, and 6, PV1, PV2, . . . , PVn exemplify solar photovoltaic (PV) modules (or subsection of a module) assigned to a group. In some instances, one or multiple PV cells may be referred to as a module. H1, H2, . . . , Hn exemplify embodiments of inverters that are configured for generating high frequency AC electrical energy in the range of kHz. The power capacity can be related to the module power rating. Z1, Z2, . . . , Zn exemplify resonant networks including discrete or integrated components. L1, L2, . . . , Ln exemplify transmitter windings or antennae.

Further, as shown in FIGS. 3 and 4, LR exemplify a receiver winding or antenna. ZR exemplify a receiver resonant network, which includes discrete and/or integrated components configured to receive electricity or signals from the receiver winding or antenna LR. HR exemplify a resonant converter stage, which may include an active or passive rectifier sized based on the amount of PV modules configured with the receiver. In some embodiments, the size of the resonant converter stage is based on the maximum number of PV modules foreseen for the application. CR shown in FIGS. 3 and 4 exemplify a DC link at the transmitter side. This link may comprise a capacitor, a resistor, an inductor or a combination thereof, depending upon the load or inverter stage topology. ZL shown in FIG. 3 exemplify the load supplied with electrical energy by the system. ZL may be a DC load or a converter that converts DC to AC or to another form of DC energy. M1, M2, . . . , Mn shown in FIGS. 3 and 4 exemplify resonant inductive coupling between the transmitter side windings L1, L2, . . . , Ln and the receiver side winding LR, wherein this coupling is accomplished across a distance, over a separation, across an object, across a structure, across a barrier, or any combination thereof. For example, M1, M2, . . . , Mn can be understood to be one or more magnetic field(s) that are generated or altered by the transmitter side windings L1, L2, . . . , Ln, which affects LR to generate electricity at LR. In one example, M1, M2, . . . , Mn exemplify an interaction between L1, L2, . . . , Ln with LR without a direct physical or electrical connection therebetween.

When in operation, electrical energy is transmitted from the plurality of wireless photovoltaic modules (shown on the left side in FIG. 3) to the wireless energy receiver device (shown on the right side in FIG. 3), as indicated by arrows M1, M2, . . . , Mn. The number of wireless energy receiver devices can be more than one. In some embodiments, the number of wireless energy receiver devices is fewer than the number of photovoltaic modules. In some embodiments, the number of wireless energy receiver devices is fewer than the number of wireless transmitter devices. In some embodiments, the number of wireless energy receiver devices is fewer than the number of wireless transmitter inductive windings or antennae L1, L2, . . . , Ln.

FIG. 4 shows a schematic diagram of yet another embodiment, which includes various components that are similar to those shown in FIG. 3. In the photovoltaic system 400, there are components directed towards a situation of being connected to an AC load, such as for example, but not necessarily limited to, a case where energy is delivered to the public electrical grid. The embodiment of the photovoltaic system 400 shown in FIG. 4 has an inverter $H_G$ which can provide AC at the output end of the circuit of the receiver. For example, the photovoltaic system 400 includes circuitry and components $H_G$, $L_G$, and $V_G$, that are downstream from receiver winding LR. As shown in FIG. 4, $H_G$ exemplifies a grid side inverter for solar-to-grid connected application. As shown in FIG. 4, $L_G$ exemplifies a grid side filter, and comprises an inductor or a configuration of passive components. As shown in FIG. 4, $V_G$ exemplifies an AC public grid or another kind of AC load.

Figure 5:
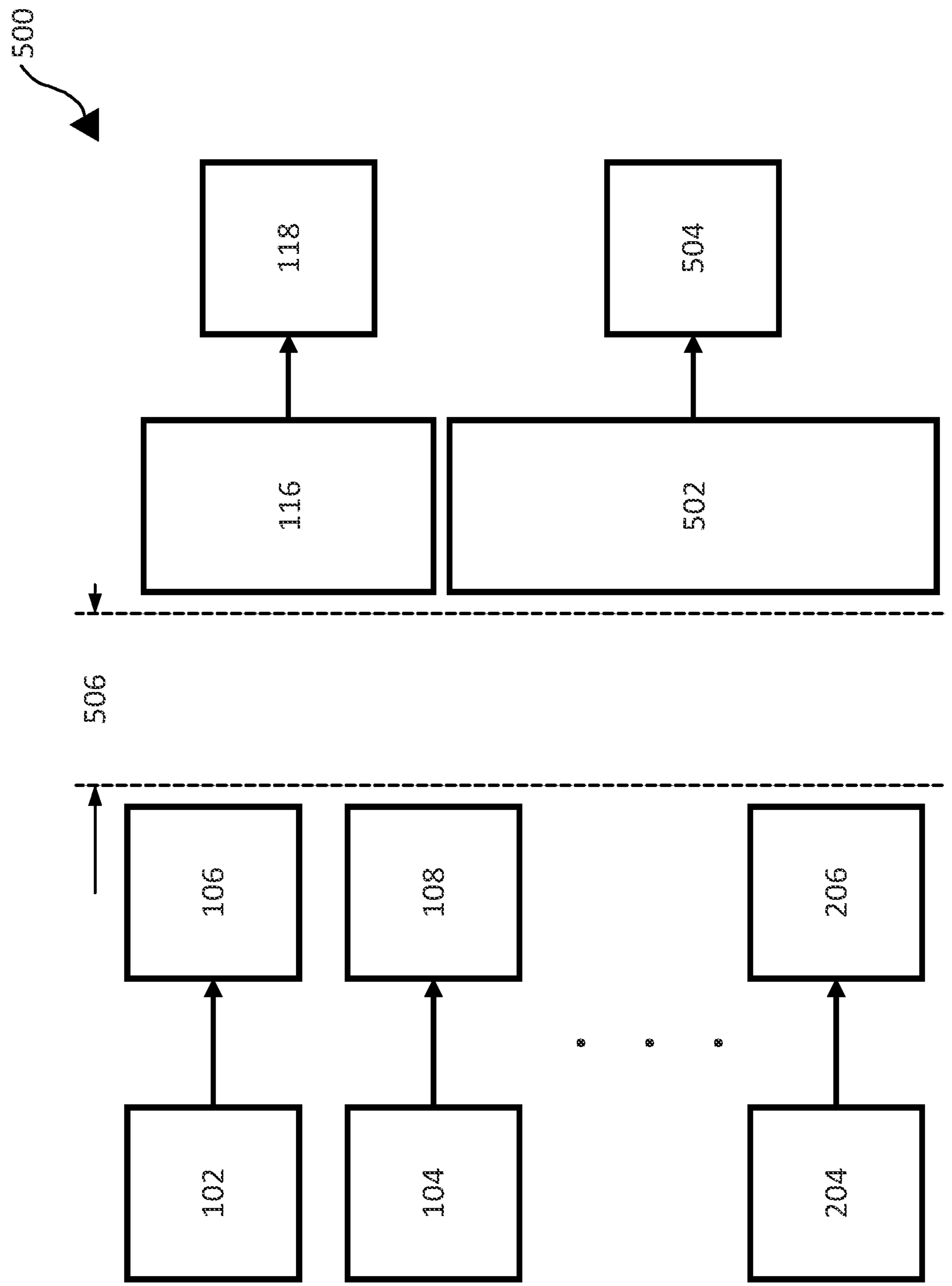
FIG. 5 is a schematic diagram of yet another embodiment of a photovoltaic system.

FIG. 5 shows another schematic diagram of an embodiment of a photovoltaic system 500, which is similar to the photovoltaic system 200 shown in FIG. 2. As shown in FIG. 5, the quantity of receiver components 116, 502 are fewer than the quantity of solar modules 102, 104, 204. As shown in FIG. 5, the quantity of receiver components 116, 502 are fewer than the quantity of solar modules 102, 104, 204. As shown in FIG. 5, the quantity of receiver components 116, 502 are fewer than the quantity of the wireless energy transmitter devices 106, 108, 206.

The photovoltaic system 500 includes multiple solar modules 102, 104, 204. Each of the solar modules 102, 104, 204 are electrically connected to a wireless energy transmitter device 106, 108, 206, respectively.

The receiver components 116, 502 are electrically and physically separated (i.e., not in direct contact) by a distance 506 from all of the wireless energy transmitter devices 106, 108, 206.

In some embodiments, any of the values and ranges for the distance 506 described herein can be combined with any of the other values and ranges described herein.

In some embodiments, the distance 506 is greater than 0.1 cm. In some embodiments, the distance 506 is greater than 1 cm. In some embodiments, the distance 506 is greater than 1.5 cm. In some embodiments, the distance 506 is greater than 2 cm. In some embodiments, the distance 506 is greater than 3 cm. In some embodiments, the distance 506 is greater than 4 cm. In some embodiments, the distance 506 is greater than 5 cm. In some embodiments, the distance 506 is greater than 6 cm. In some embodiments, the distance 506 is greater than 7 cm. In some embodiments, the distance 506 is greater than 8 cm. In some embodiments, the distance 506 is greater than 9 cm. In some embodiments, the distance 506 is greater than 10 cm. In some embodiments, the distance 506 is greater than 11 cm. In some embodiments, the distance 506 is greater than 12 cm. In some embodiments, the distance 506 is greater than 13 cm. In some embodiments, the distance 506 is greater than 14 cm. In some embodiments, the distance 506 is greater than 15 cm. In some embodiments, the distance 506 is greater than 16 cm. In some embodiments, the distance 506 is greater than 17 cm. In some embodiments, the distance 506 is greater than 18 cm. In some embodiments, the distance 506 is greater than 19 cm. In some embodiments, the distance 506 is greater than 20 cm. In some embodiments, the distance 506 is greater than 21 cm. In some embodiments, the distance 506 is greater than 22 cm. In some embodiments, the distance 506 is greater than 23 cm. In some embodiments, the distance 506 is greater than 24 cm. In some embodiments, the distance 506 is greater than 25 cm. In some embodiments, the distance 506 is greater than 26 cm. In some embodiments, the distance 506 is greater than 27 cm. In some embodiments, the distance 506 is greater than 28 cm. In some embodiments, the distance 506 is greater than 29 cm. In some embodiments, the distance 506 is less than 30 cm. In some embodiments, the distance 506 is less than 29 cm. In some embodiments, the distance 506 is less than 28 cm. In some embodiments, the distance 506 is less than 27 cm. In some embodiments, the distance 506 is less than 26 cm. In some embodiments, the distance 506 is less than 25 cm. In some embodiments, the distance 506 is less than 24 cm. In some embodiments, the distance 506 is less than 23 cm. In some embodiments, the distance 506 is less than 22 cm. In some embodiments, the distance 506 is less than 21 cm. In some embodiments, the distance 506 is less than 20 cm. In some embodiments, the distance 506 is less than 19 cm. In some embodiments, the distance 506 is less than 18 cm. In some embodiments, the distance 506 is less than 17 cm. In some embodiments, the distance 506 is less than 16 cm. In some embodiments, the distance 506 is less than 15 cm. In some embodiments, the distance 506 is less than 14 cm. In some embodiments, the distance 506 is less than 13 cm.

In some embodiments, the distance 506 is less than 12 cm. In some embodiments, the distance 506 is less than 11 cm. In some embodiments, the distance 506 is less than 10 cm. In some embodiments, the distance 506 is less than 9 cm. In some embodiments, the distance 506 is less than 8 cm. In some embodiments, the distance 506 is less than 7 cm. In some embodiments, the distance 506 is less than 6 cm. In some embodiments, the distance 506 is less than 5 cm. In some embodiments, the distance 506 is less than 4 cm. In some embodiments, the distance 506 is less than 3 cm. In some embodiments, the distance 506 is less than 2 cm. In some embodiments, the distance 506 is less than 1 cm.

In some embodiments, the distance 506 is 0.1 cm to 30 cm. In some embodiments, the distance 506 is 0.1 cm to 29 cm. In some embodiments, the distance 506 is 0.1 cm to 28 cm. In some embodiments, the distance 506 is 0.1 cm to 27 cm. In some embodiments, the distance 506 is 0.1 cm to 26 cm. In some embodiments, the distance 506 is 0.1 cm to 25 cm. In some embodiments, the distance 506 is 0.1 cm to 23 cm. In some embodiments, the distance 506 is 0.1 cm to 22 cm. In some embodiments, the distance 506 is 0.1 cm to 21 cm. In some embodiments, the distance 506 is 0.1 cm to 20 cm. In some embodiments, the distance 506 is 0.1 cm to 15 cm. In some embodiments, the distance 506 is 0.1 cm to 10 cm. In some embodiments, the distance 506 is 0.1 cm to 5 cm. In some embodiments, the distance 506 is 0.1 cm to 4 cm. In some embodiments, the distance 506 is 0.1 cm to 3 cm. In some embodiments, the distance 506 is 0.1 cm to 2 cm. In some embodiments, the distance 506 is 0.1 cm to 1 cm.

In some embodiments, the distance 506 is 1 cm to 30 cm. In some embodiments, the distance 506 is 1 cm to 29 cm. In some embodiments, the distance 506 is 1 cm to 28 cm. In some embodiments, the distance 506 is 1 cm to 27 cm. In some embodiments, the distance 506 is 1 cm to 26 cm. In some embodiments, the distance 506 is 1 cm to 25 cm. In some embodiments, the distance 506 is 1 cm to 23 cm. In some embodiments, the distance 506 is 1 cm to 22 cm. In some embodiments, the distance 506 is 1 cm to 21 cm. In some embodiments, the distance 506 is 1 cm to 20 cm. In some embodiments, the distance 506 is 1 cm to 15 cm. In some embodiments, the distance 506 is 1 cm to 10 cm. In some embodiments, the distance 506 is 1 cm to 9 cm. In some embodiments, the distance 506 is 1 cm to 8 cm. In some embodiments, the distance 506 is 1 cm to 7 cm. In some embodiments, the distance 506 is 1 cm to 6 cm. In some embodiments, the distance 506 is 1 cm to 5 cm. In some embodiments, the distance 506 is 1 cm to 4 cm. In some embodiments, the distance 506 is 1 cm to 3 cm. In some embodiments, the distance 506 is 1 cm to 2 cm.

In some embodiments, the distance 506 is 1.5 cm to 30 cm. In some embodiments, the distance 506 is 1.5 cm to 29 cm. In some embodiments, the distance 506 is 1.5 cm to 28 cm. In some embodiments, the distance 506 is 1.5 cm to 27 cm. In some embodiments, the distance 506 is 1.5 cm to 26 cm. In some embodiments, the distance 506 is 1.5 cm to 25 cm. In some embodiments, the distance 506 is 1.5 cm to 23 cm. In some embodiments, the distance 506 is 1.5 cm to 22 cm. In some embodiments, the distance 506 is 1.5 cm to 21 cm. In some embodiments, the distance 506 is 1.5 cm to 20 cm. In some embodiments, the distance 506 is 1.5 cm to 15 cm. In some embodiments, the distance 506 is 1.5 cm to 10 cm. In some embodiments, the distance 506 is 1.5 cm to 9 cm. In some embodiments, the distance 506 is 1.5 cm to 8 cm. In some embodiments, the distance 506 is 1.5 cm to 7 cm. In some embodiments, the distance 506 is 1.5 cm to 6 cm. In some embodiments, the distance 506 is 1.5 cm to 5 cm. In some embodiments, the distance 506 is 1.5 cm to 4 cm. In some embodiments, the distance 506 is 1.5 cm to 3 cm. In some embodiments, the distance 506 is 1.5 cm to 2 cm.

In some embodiments, the distance 506 is 2 cm to 30 cm. In some embodiments, the distance 506 is 2 cm to 29 cm. In some embodiments, the distance 506 is 2 cm to 28 cm. In some embodiments, the distance 506 is 2 cm to 27 cm. In some embodiments, the distance 506 is 2 cm to 26 cm. In some embodiments, the distance 506 is 2 cm to 25 cm. In some embodiments, the distance 506 is 2 cm to 23 cm. In some embodiments, the distance 506 is 2 cm to 22 cm. In some embodiments, the distance 506 is 2 cm to 21 cm. In some embodiments, the distance 506 is 2 cm to 20 cm. In some embodiments, the distance 506 is 2 cm to 15 cm. In some embodiments, the distance 506 is 2 cm to 10 cm. In some embodiments, the distance 506 is 2 cm to 9 cm. In some embodiments, the distance 506 is 2 cm to 8 cm. In some embodiments, the distance 506 is 2 cm to 7 cm. In some embodiments, the distance 506 is 2 cm to 6 cm. In some embodiments, the distance 506 is 2 cm to 5 cm. In some embodiments, the distance 506 is 2 cm to 4 cm. In some embodiments, the distance 506 is 2 cm to 3 cm.

In some embodiments, the distance 506 is 3 cm to 30 cm. In some embodiments, the distance 506 is 3 cm to 29 cm. In some embodiments, the distance 506 is 3 cm to 28 cm. In some embodiments, the distance 506 is 3 cm to 27 cm. In some embodiments, the distance 506 is 3 cm to 26 cm. In some embodiments, the distance 506 is 3 cm to 25 cm. In some embodiments, the distance 506 is 3 cm to 23 cm. In some embodiments, the distance 506 is 3 cm to 22 cm. In some embodiments, the distance 506 is 3 cm to 21 cm. In some embodiments, the distance 506 is 3 cm to 20 cm. In some embodiments, the distance 506 is 3 cm to 15 cm. In some embodiments, the distance 506 is 3 cm to 10 cm. In some embodiments, the distance 506 is 3 cm to 9 cm. In some embodiments, the distance 506 is 3 cm to 8 cm. In some embodiments, the distance 506 is 3 cm to 7 cm. In some embodiments, the distance 506 is 3 cm to 6 cm. In some embodiments, the distance 506 is 3 cm to 5 cm. In some embodiments, the distance 506 is 3 cm to 4 cm.

In some embodiments, the distance 506 is 5 cm to 30 cm. In some embodiments, the distance 506 is 5 cm to 29 cm. In some embodiments, the distance 506 is 5 cm to 28 cm. In some embodiments, the distance 506 is 5 cm to 27 cm. In some embodiments, the distance 506 is 5 cm to 26 cm. In some embodiments, the distance 506 is 5 cm to 25 cm. In some embodiments, the distance 506 is 5 cm to 23 cm. In some embodiments, the distance 506 is 5 cm to 22 cm. In some embodiments, the distance 506 is 5 cm to 21 cm. In some embodiments, the distance 506 is 5 cm to 20 cm. In some embodiments, the distance 506 is 5 cm to 15 cm. In some embodiments, the distance 506 is 5 cm to 10 cm. In some embodiments, the distance 506 is 5 cm to 9 cm. In some embodiments, the distance 506 is 5 cm to 8 cm. In some embodiments, the distance 506 is 5 cm to 7 cm. In some embodiments, the distance 506 is 5 cm to 6 cm.

In some embodiments, the distance 506 is 6 cm to 30 cm. In some embodiments, the distance 506 is 6 cm to 29 cm. In some embodiments, the distance 506 is 6 cm to 28 cm. In some embodiments, the distance 506 is 6 cm to 27 cm. In some embodiments, the distance 506 is 6 cm to 26 cm. In some embodiments, the distance 506 is 6 cm to 25 cm. In some embodiments, the distance 506 is 6 cm to 23 cm. In some embodiments, the distance 506 is 6 cm to 22 cm. In some embodiments, the distance 506 is 6 cm to 21 cm. In some embodiments, the distance 506 is 6 cm to 20 cm. In some embodiments, the distance 506 is 6 cm to 15 cm. In some embodiments, the distance 506 is 6 cm to 10 cm. In some embodiments, the distance 506 is 6 cm to 9 cm. In some embodiments, the distance 506 is 6 cm to 8 cm. In some embodiments, the distance 506 is 6 cm to 7 cm.

In some embodiments, the distance 506 is 7 cm to 30 cm. In some embodiments, the distance 506 is 7 cm to 29 cm. In some embodiments, the distance 506 is 7 cm to 28 cm. In some embodiments, the distance 506 is 7 cm to 27 cm. In some embodiments, the distance 506 is 7 cm to 26 cm. In some embodiments, the distance 506 is 7 cm to 25 cm. In some embodiments, the distance 506 is 7 cm to 23 cm. In some embodiments, the distance 506 is 7 cm to 22 cm. In some embodiments, the distance 506 is 7 cm to 21 cm. In some embodiments, the distance 506 is 7 cm to 20 cm. In some embodiments, the distance 506 is 7 cm to 15 cm. In some embodiments, the distance 506 is 7 cm to 10 cm. In some embodiments, the distance 506 is 7 cm to 9 cm. In some embodiments, the distance 506 is 7 cm to 8 cm.

In some embodiments, the distance 506 is 8 cm to 30 cm. In some embodiments, the distance 506 is 8 cm to 29 cm. In some embodiments, the distance 506 is 8 cm to 28 cm. In some embodiments, the distance 506 is 8 cm to 27 cm. In some embodiments, the distance 506 is 8 cm to 26 cm. In some embodiments, the distance 506 is 8 cm to 25 cm. In some embodiments, the distance 506 is 8 cm to 23 cm. In some embodiments, the distance 506 is 8 cm to 22 cm. In some embodiments, the distance 506 is 8 cm to 21 cm. In some embodiments, the distance 506 is 8 cm to 20 cm. In some embodiments, the distance 506 is 8 cm to 15 cm. In some embodiments, the distance 506 is 8 cm to 10 cm. In some embodiments, the distance 506 is 8 cm to 9 cm.

In some embodiments, the distance 506 is 9 cm to 30 cm. In some embodiments, the distance 506 is 9 cm to 29 cm. In some embodiments, the distance 506 is 9 cm to 28 cm. In some embodiments, the distance 506 is 9 cm to 27 cm. In some embodiments, the distance 506 is 9 cm to 26 cm. In some embodiments, the distance 506 is 9 cm to 25 cm. In some embodiments, the distance 506 is 9 cm to 23 cm. In some embodiments, the distance 506 is 9 cm to 22 cm. In some embodiments, the distance 506 is 9 cm to 21 cm. In some embodiments, the distance 506 is 9 cm to 20 cm. In some embodiments, the distance 506 is 9 cm to 15 cm. In some embodiments, the distance 506 is 9 cm to 10 cm. In some embodiments, the distance 506 is 10 cm to 30 cm. In some embodiments, the distance 506 is 10 cm to 29 cm. In some embodiments, the distance 506 is 10 cm to 28 cm. In some embodiments, the distance 506 is 10 cm to 27 cm. In some embodiments, the distance 506 is 10 cm to 26 cm. In some embodiments, the distance 506 is 10 cm to 25 cm. In some embodiments, the distance 506 is 10 cm to 23 cm. In some embodiments, the distance 506 is 10 cm to 22 cm. In some embodiments, the distance 506 is 10 cm to 21 cm. In some embodiments, the distance 506 is 10 cm to 20 cm. In some embodiments, the distance 506 is 10 cm to 15 cm.

In some embodiments, the distance 506 is 15 cm to 30 cm. In some embodiments, the distance 506 is 15 cm to 29 cm. In some embodiments, the distance 506 is 15 cm to 28 cm. In some embodiments, the distance 506 is 15 cm to 27 cm. In some embodiments, the distance 506 is 15 cm to 26 cm. In some embodiments, the distance 506 is 15 cm to 25 cm. In some embodiments, the distance 506 is 15 cm to 23 cm. In some embodiments, the distance 506 is 15 cm to 22 cm. In some embodiments, the distance 506 is 15 cm to 21 cm. In some embodiments, the distance 506 is 15 cm to 20 cm.

In operation, each of the solar modules 102, 104, 204 receive photons and then generate electrical current and provides electricity to each of the respective wireless energy transmitter devices 106, 108, 206. That is, the solar module 102 provides electricity to the wireless energy transmitter device 106. The solar module 104 provides electricity to the wireless energy transmitter device 108. The solar module 204 provides electricity to the wireless energy transmitter device 206.

The wireless energy transmitter devices 106, 108, 206 are configured to transmit energy to the receiver components 116, 502 or provides an energy field(s) which in turn affects the receiver components 116, 502. The receiver components 116, 502, when in operation, generate electrical currents and provide to their respective receiver circuitries 118, 504 with electricity.

FIG. 6 shows a schematic diagram of another embodiment, which includes various components that are similar to those shown in FIGS. 3 and 4. In the photovoltaic system 600, there are multiple receivers on the right side of FIG. 6. Similar to the photovoltaic system 500 in FIG. 5, there are at least two receivers. In some embodiments, the photovoltaic system includes more than two receivers. As shown in FIG. 6, the number of transmitter modules shown on the left side are more than the number of receiver modules. That is, on the left side, "n" designates the number of wireless energy transmitter devices or components (e.g., PVn, Hn, Zn, Ln) included in the photovoltaic system 600. Further, on the right side of FIG. 6, "m" designates the number of receivers (e.g., LRm, ZRm, HRm, CRm, ZLm). Accordingly, LR1 shown in FIG. 6 exemplify a receiver winding or antenna for the first receiver. ZR1 shown in FIG. 6 exemplify a receiver resonant network for the first receiver. HR1 shown in FIG. 6 exemplify a resonant converter stage for the first receiver. CR1 shown in FIG. 6 exemplify a DC link at the transmitter side for the first receiver. ZL1 shown in FIG. 6 exemplify the load supplied with electrical energy by the system for the first receiver. Further, LRm shown in FIG. 6 exemplify a receiver winding or antenna for the "m-th" receiver. ZRm shown in FIG. 6 exemplify a receiver resonant network for the "m-th" receiver. HRm shown in FIG. 6 exemplify a resonant converter stage for the "m-th" receiver. CRm shown in FIG. 6 exemplify a DC link at the transmitter side for the "m-th" receiver. ZLm shown in FIG. 6 exemplify the load supplied with electrical energy by the system for the "m-th" receiver. According to this embodiment, the following relationship applies: $n>m$. In some embodiments, the following relationship applies: $n \geq m$.

It will be understood that FIGS. 3, 4, and 6 show schematic circuit models only and should not be interpreted to limit the physical placement of actual circuitry.

According to some embodiments disclosed herein, electrical energy can be transferred from multiple independent sources (such as for example but not limited to several photovoltaic modules) through the air or through an obstruction (such as for example several layers of roofing material or structure) to at least one wireless energy receiver device. Accordingly, these embodiments do not include electric cables and electrical connectors, such as Multiam connectors, through holes made in the building's structure for connecting the photovoltaic modules to the various electric circuits of the building structure. Accordingly, the embodiments of the RIPV systems disclosed herein can eliminate the risk of system failures that are caused by or are related to Multiam connectors.

According to some embodiments, a roofing system comprises a roof structure including a roof deck; at least two photovoltaic devices disposed above the roof deck, wherein each of the at least two photovoltaic devices includes: at least one solar cell, and at least one wireless energy transmitter device, wherein the at least one wireless energy transmitter device is electrically connected to the at least one solar cell.

In some embodiments, each of a transmitter coil (which can be a component of the wireless transmitter device (e.g., 106, 108, 206 shown in FIG. 5)), a receiver coil (which can be a part of the receiver component (e.g., 116, 502 shown in FIG. 5)), or both of the transmitter coil and the receiver coil, comprises a winding of wire surrounding at least one ferrite segment. The ferrite segment(s) can reduce magnetic leakage flux, such as for example, in the backside of the receiver coil. When there is a magnetic field near the receiver coil, a current is generated through the receiver coil. When there is an alternating magnetic field near the receiver coil, an AC current is generated through the receiver coil. In the transmitter coil or the receiver coil, or in both, the number of ferrite segments in the core portion of the winding of wire can be represented by X. In some embodiments, X is any number from 1 to 16.

In some embodiments, X is any number from 2 to 16. In some embodiments, X is any number from 3 to 16. In some embodiments, X is any number from 4 to 16. In some embodiments, X is any number from 5 to 16. In some embodiments, X is any number from 6 to 16. In some embodiments, X is any number from 7 to 16. In some embodiments, X is any number from 8 to 16. In some embodiments, X is any number from 9 to 16. In some embodiments, X is any number from 10 to 16. In some embodiments, X is any number from 11 to 16. In some embodiments, X is any number from 12 to 16. In some embodiments, X is any number from 13 to 16. In some embodiments, X is any number from 14 to 16. In some embodiments, X is any number from 15 to 16.

In some embodiments, X is any number from 2 to 6. In some embodiments, X is any number from 3 to 6. In some embodiments, X is any number from 4 to 6. In some embodiments, X is any number from 5 to 6.

In some embodiments, X is any number from 6 to 16. In some embodiments, X is any number from 6 to 15. In some embodiments, X is any number from 6 to 14. In some embodiments, X is any number from 6 to 13. In some embodiments, X is any number from 6 to 12. In some embodiments, X is any number from 6 to 11. In some embodiments, X is any number from 6 to 10. In some embodiments, X is any number from 6 to 9. In some embodiments, X is any number from 6 to 8. In some embodiments, X is any number from 6 to 7.

In some embodiments, the operating range of an input voltage for each solar module has a range of 46 V-50 V.

In some embodiments, the photovoltaic system can deliver wide range of power to the load. For example, but not necessarily limited to, the load can be 0 W-50 W. For example, but not necessarily limited to, the output current downstream from the rectifier of the receiver module can be 0 A—1.1 A.

In some embodiments, for each ratio of 2 transmitter modules to 1 receiver module, the photovoltaic system can have an input voltage of 48 V with half load (0.5 A) for each wireless energy transmitter device.

In some embodiments, for each ratio of 2 wireless energy transmitter device to 1 receiver component, the photovoltaic system can have an input voltage of 48 V with half load (0.5 A) for each wireless energy transmitter device.

Figure 7:
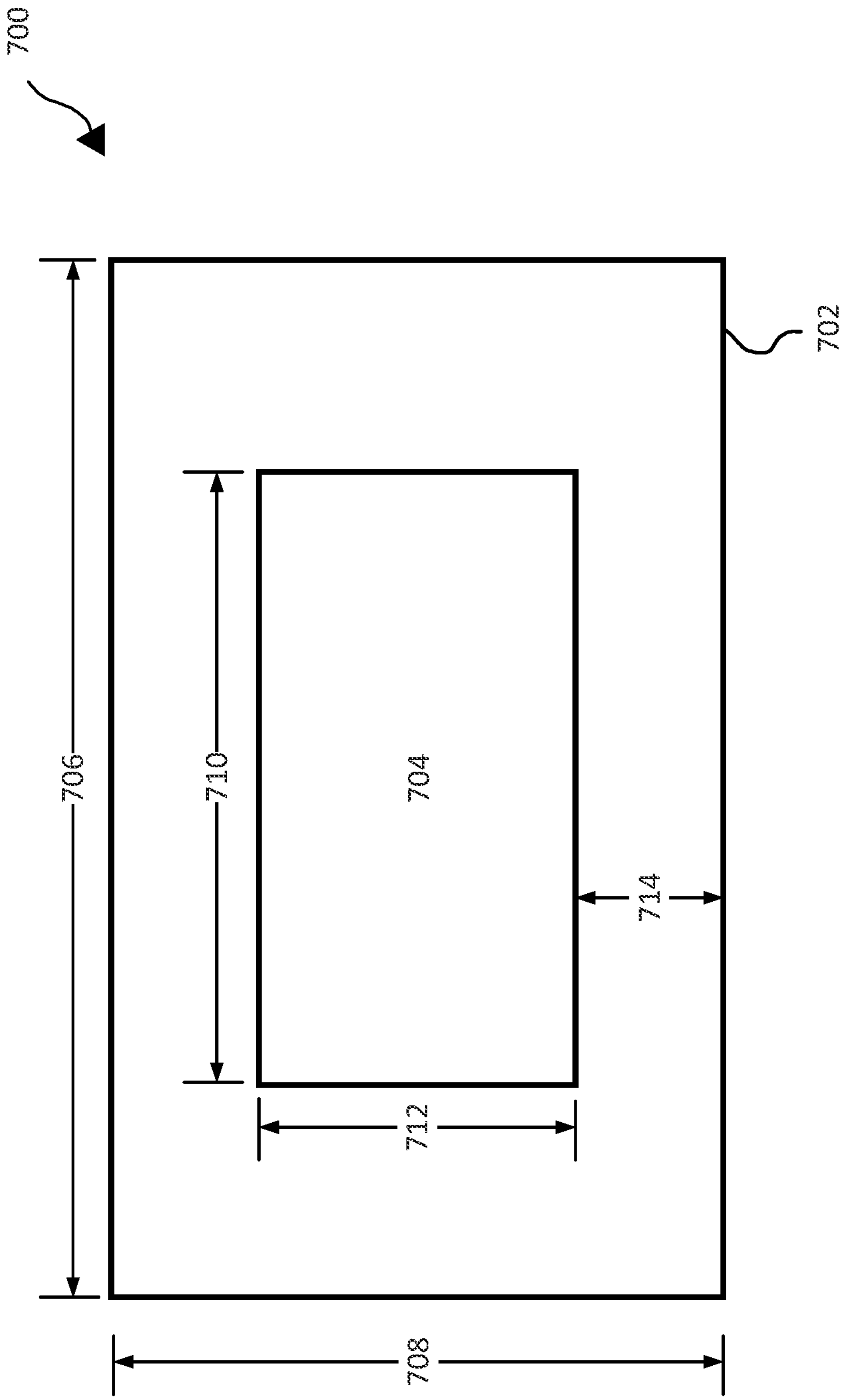
FIG. 7 is a schematic diagram of a winding according to an embodiment.

FIG. 7 shows an embodiment of a winding 700 for either or both of the wireless energy transmitter device(s) or the receiver component(s). The winding 700 has a coil of wires 702 around an internal "keep-out" area 704. In the "keep-out" area 704, the wires 702 are not present. Instead, in some embodiments, ferrite segments can be placed in the "keep-out" area 704. The winding 700 has an outside length 706 and an outside width 708. Further, the "keep-out" area 704 can be defined by an internal length 710 (i.e., keep-out length) and an internal width 712 (i.e., keep-out width). The region of wires 702 can have a width 714, known as a winding window width, which surrounds the "keep-out" area 704.

Figure 8:
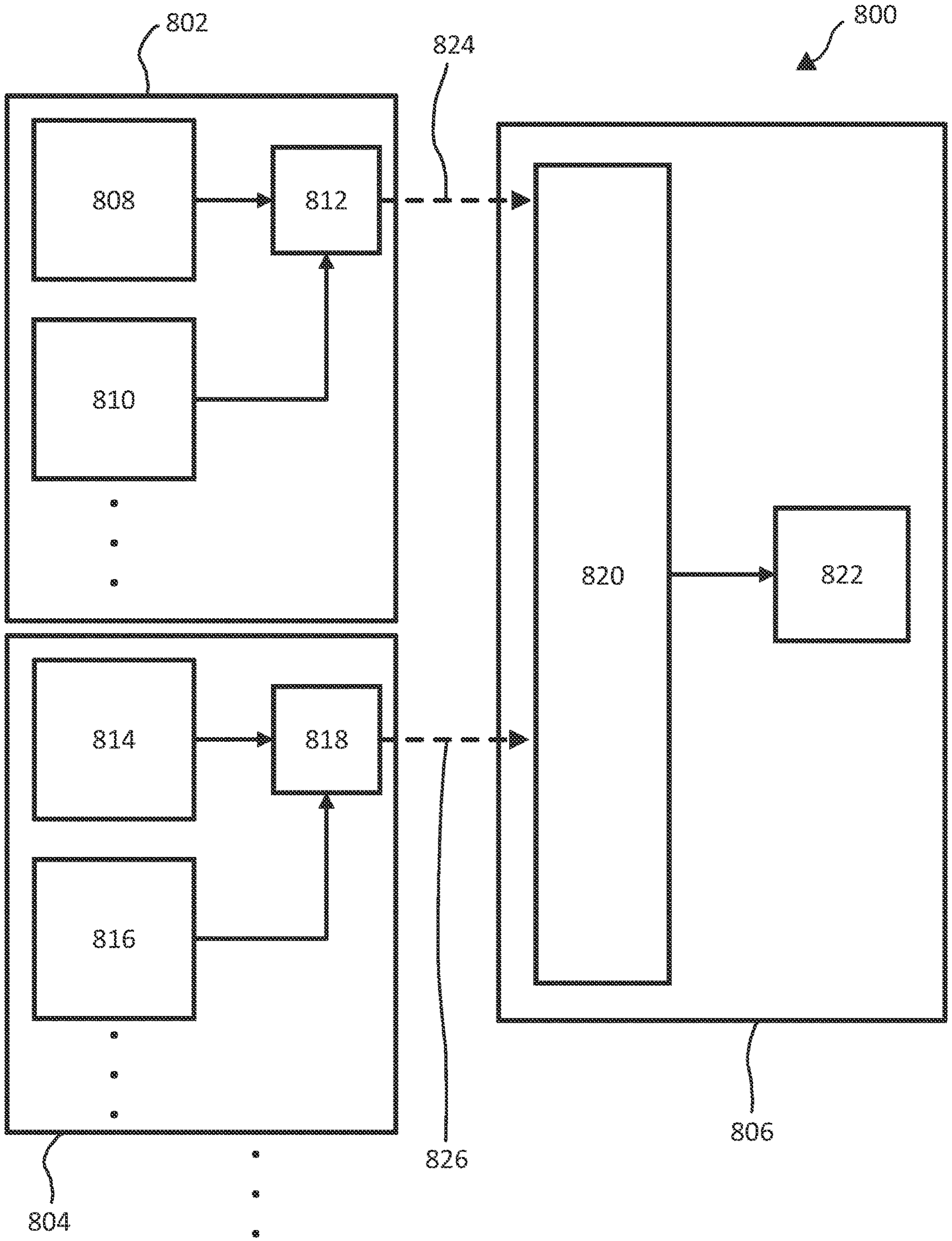
FIG. 8 is a schematic diagram of an embodiment of a photovoltaic system.

FIG. 8 shows another schematic diagram of an embodiment of a photovoltaic system 800. In FIG. 8, there is a plurality of transmitter modules 802, 804 such that the quantity of transmitter modules 802, 804 is greater than the quantity of receiver module(s) 806. The transmitter module 802 includes at least two solar modules 808, 810 that are electrically connected to a wireless energy transmitter device 812. The transmitter module 804 includes at least two solar modules 814, 816 that are electrically connected to wireless energy transmitter device 818.

The receiver module 806 includes, in this embodiment, a receiver component 820 that is electrically connected to a receiver circuitry 822. The receiver module 806 is electrically separated from all of the transmitter modules 802, 804. These transmitter modules 802, 804 are set a distance apart from the receiver module 806, such that the transmitter modules 802, 804 are not in direct physical contact with the receiver module 806. Further, the transmitter modules 802, 804 are not electrically connected with the receiver module 806. In operation, each of the solar modules 808, 810, 814, 816 operate to receive photons and then generate electrical current to provide electricity to their electrically associated wireless energy transmitter devices 812, 818. That is, the solar modules 808, 810 provide electricity to the wireless energy transmitter device 812. The solar modules 814, 816 provide electricity to the wireless energy transmitter device 818. Then, the wireless energy transmitter devices 812, 818 transmit energy to the receiver component 820 or provides at least one energy field(s) (e.g., magnetic field(s)) 824, 826 which in turn affects the receiver component 820. The affected receiver component 820 generates an electrical current and provides the receiver circuitry 822 with electricity.

In some embodiments, the energy field(s) 824, 826 is(are) magnetic field(s) generated by the wireless energy transmitter devices 812, 818. The receiver component 820 includes at least one antenna, winding, or coil that is affected by the magnetic field(s) 824, 826 to generate electricity.

In some embodiments of the photovoltaic system, the following relationship exists amongst the quantity of solar modules (e.g., 808, 810, 814, 816 shown in FIG. 8), the quantity of the wireless energy transmitter devices (e.g., 812, 818 shown in FIG. 8), and the quantity of receiver component (e.g., 820 shown in FIG. 8).

In some embodiments of the photovoltaic system, the ratio of the quantity of solar modules (e.g., 808, 810, 814, 816 shown in FIG. 8) to the quantity of the wireless energy transmitter devices (e.g., 812, 818 shown in FIG. 8) to the quantity of receiver component (e.g., 116 and 502 shown in FIG. 5; 820 shown in FIG. 8) in the embodiments of the photovoltaic system include, but are not limited to, 2:2:1; 3:2:1; 3:3:1; 3:3:2; 4:3:1; 4:3:2; 4:4:1; 4:4:2; 4:4:3; 5:4:1; 5:4:2; 5:4:3; 5:5:1; 5:5:2; 5:5:3; 5:5:4; 6:5:1; 6:5:2; 6:5:3; 6:5:4; 6:6:1; 6:6:2; 6:6:3; 6:6:4; 6:6:5; 7:6:1; 7:6:2; 7:6:3; 7:6:4; 7:6:5; 7:7:1; 7:7:2; 7:7:3; 7:7:4; 7:7:5; 7:7:6; 8:7:1; 8:7:2; 8:7:3; 8:7:4; 8:7:5; 8:7:6; 8:8:1; 8:8:2; 8:8:3; 8:8:4; 8:8:5; 8:8:6; 8:8:7; 9:8:1; 9:8:2; 9:8:3; 9:8:4; 9:8:5; 9:8:6;

9:8:7; 9:9:1; 9:9:2; 9:9:3; 9:9:4; 9:9:5; 9:9:6; 9:9:7; 9:9:8; 10:9:1; 10:9:2; 10:9:3; 10:9:4; 10:9:5; 10:9:6; 10:9:7; 10:9:8; 10:10:1; 10:10:2; 10:10:3; 10:10:4; 10:10:5; 10:10:6; 10:10:7; 10:10:8; or 10:10:9.

EXAMPLES

The following examples are provided to ensure that the operational functionalities of the various embodiments disclosed herein are appreciated. The scopes of protection are not necessarily limited by the various examples provided below.

Example 1

This Example shows that symmetrical DC voltages from solar cells which are phase optimized by inverters can achieve a very good wireless power transfer efficiency.

This can represent a situation where all of the solar cells are at their maximum capacity for generating electricity.

In an exemplary photovoltaic system (similar to 100 shown in FIG. 1), DC electricity was supplied (e.g., by two solar cells), and the DC electricity were symmetric. As used herein, symmetric DC electricity can mean that that the DC voltages from different sources are equal values.

The input power was around 45 W, and the input voltage was at 8 V for both (symmetric), and the AC frequency was 100 kHz.

Further, in this Example, the inverters' frequency phase shifts were optimized (e.g., a phase shift of 180 degrees), the power transfer efficiency achievable was determined to be around 98%, based on measurements of $DC_{input}$ measured immediately downstream of DC sources (e.g., solar cells) and $DC_{output}$ measured immediately downstream of at the receiver module's rectifier.

Example 2

This Example shows that asymmetrical DC voltages from solar cells which are phase optimized by inverters can achieve a very good wireless power transfer efficiency.

This can represent a situation where multiple solar cells that are distributed on a roof structure are receiving different amounts of solar rays (i.e., photons) due to their relative positions to the sun. This can lead to these solar cells generating different amount of DC voltages.

In an exemplary photovoltaic system (similar to 100 shown in FIG. 1), the DC electricity supplied by two solar cells were asymmetric. As used herein, asymmetric DC electricity can mean that that the DC voltages from different sources are not equal values. For the first solar cell, the input power was 44 W, and the input voltage was at 8 V. For the second solar cell, the input power was 42 W, and the input voltage was 10 V. The AC frequency was at 100 kHz.

Under these asymmetric operating conditions, it has been found that setting the phase shift to 180 degrees between the inverters can be difficult or at times impossible. Yet, even under such conditions, some embodiments were capable of achieving or maintaining the power transfer efficiency of around 98%.

Example 3

This Example shows that asymmetrical DC voltages from solar cells which are not phase optimized by inverters can achieve a good wireless power transfer efficiency.

This can represent a situation where multiple solar cells that are distributed on a roof structure are receiving different amounts of solar rays due to their relative positions to the sun. This can lead to these solar cells generating different amount of DC voltages.

Further, this example represents the situation where the inverters were not perfectly optimizing the phases of the AC waveforms.

In an exemplary photovoltaic system (similar to 200 shown in FIG. 2), where the number of transmitter modules were three, even with asymmetric DC voltages from the solar cells and phase shifts that are not exactly 180 degrees, the power transfer efficiency was determined to be above 90%, and in some instances, the power transfer efficiency was in the range of 92% to 98%. The data from an Example of three DC sources (e.g., solar cells) and a single receiver is shown below TABLE 1. The three $DC_{input}$ represent the asymmetric voltages generated by three different transmitter modules (transmitter module #1, transmitter module #2, transmitter module #3), and the Inverter phase shift show the different phase shifts of the AC waveforms generated by respective inverters of the transmitter modules. The coupling factor (k) was calculated for each of the transmitter modules.

TABLE 1

| | $DC_{input}$ (V) | Inverter phase shift (Degrees) | Coupling Factor (k) |
|---|---|---|---|
| Transmitter module #1 | 10 | 160 | 0.35 |
| Transmitter module #2 | 8 | 150 | 0.25 |
| Transmitter module #3 | 12 | 180 | 0.3 |

Example 4

In this Example, two wireless energy transmitter devices with circular windings were placed at a square-shaped ferrite core. The receiver component's windings were made in two segments, similar to the wireless energy transmitter devices' windings. The segments were connected in series. The segments were placed to face the transmitters' windings.

Example 4.1

In this Example, the magnetic fields generated by the receiver component's winding segments in series were in the same direction. This exemplary system achieved acceptable power transfer efficiency when there is some Misalignment. This configuration could be an option for transferring power from two transmitter windings to a single receiver coil. TABLE 2 shows the resulting data.

In TABLE 2, the Aligned column shows the data when a center-to-center distance between a wireless energy transmitter device's winding and a receiver component's winding segment is 0 cm.

In TABLE 2, the Misaligned column shows the data when the center-to-center distance between the wireless energy transmitter device's winding and the receiver component's winding segment is 10 cm.

In TABLE 2, the Separation row shows, in cm, the distance of separation between the wireless energy transmitter device's winding and the receiver component's winding segment. In this example, it will be understood that an axis for determining the distance of "alignment" or "misalignment" is perpendicular to an axis for determining the distance of "separation." TABLE 2 shows that, as the Separation distance is increased, the calculated coupling factor (k) tended to decrease generally.

TABLE 2

| | Aligned | | | | Misaligned | | | |
|---|---|---|---|---|---|---|---|---|
| Misalignment (cm) | 0 | | | | 10 | | | |
| Separation (cm) | 1 | 2 | 3 | 4 | 1 | 2 | 3 | 4 |
| Coupling Factor (k) | 0.025 | 0.064 | 0.074 | 0.069 | 0.597 | 0.388 | 0.074 | 0.153 |

Example 4.2

This Example is similar to the above Example 4.1, but the magnetic fields generated by two receiver winding segments connected in series were in the opposite directions. Similar to the data shown in Example 4.1, the coupling factor is acceptable when there is Misalignment. TABLE 3 shows the resulting data.

TABLE 3

| | Aligned | | | | Misaligned | | | |
|---|---|---|---|---|---|---|---|---|
| Misalignment (cm) | 0 | | | | 10 | | | |
| Separation (cm) | 1 | 2 | 3 | 4 | 1 | 2 | 3 | 4 |
| Coupling Factor (k) | 0.036 | 0.029 | 0 | 0 | 0.617 | 0.42 | 0.235 | 0.174 |

In both of the Examples 4.1 and 4.2, when the coils were Aligned (i.e., the centers deviate by 0 cm), the magnetic coupling factors (k) were very weak. However, when the wireless energy transmitter devices' windings were placed at 10 cm from the center of the receiver components' winding segments (i.e., Misaligned), the coupling factors (k) were within an acceptable range for being useful for wireless power transfer.

As shown in TABLE 4, the highest coupling factor was 0.5398, when the transmitter and receiver coils were Misaligned with 2 cm distance between them. According to this example, the lowest coupling factor was 0.0364, when the transmitter and receiver coils were Misaligned by 5 cm and separated by 4 cm.

Example 5

Based on Example 4, additional variables were considered. Following Example shows the effects of different alignment conditions and separation distances as factors in the power transfer efficiencies, which can be determined from, at least, the coupling factor (k). Based on the data shown in TABLE 4 and TABLE 5, it can be understood that the power transfer efficiency can be influenced by, at least, Separation distance and the amount of Alignment or Misalignment.

TABLE 4 shows that, the highest coupling factor was achieved when the transmitter and receiver coils were slightly Misaligned at 2 cm. Further, the lowest coupling factor was achieved when the transmitter and receiver coils were Misaligned by 5 cm and separated by 4 cm.

TABLE 4

| | Aligned | | Misaligned | | | |
|---|---|---|---|---|---|---|
| Misalignment (cm) | 0 | | 3 | | 5* | |
| Separation (cm) | 2 | 4 | 2 | 4 | 2 | 4 |
| Coupling Factor (k) | 0.5398 | 0.2457 | 0.2952 | 0.1521 | 0.0606 | 0.0364 |

5*: This Misalignment was a half-way Misalignment, where the transmitter coil overlapped only by half of the receiver coil. This condition was included because this configuration is possible in real-world conditions where coils are located in a two-to-one systems where each wireless energy transmitter device overlaps half of the receiver component.

Further, TABLE 5 shows additional data collected with respect to the effect of half-way Misalignment configurations. As it can be seen in TABLE 5, the coupling factor is high when the coils were aligned, but the coupling factor was reduced by placing the coils in the halfway Misaligned configuration.

TABLE 5

| | Aligned | | | | Misaligned | | | |
|---|---|---|---|---|---|---|---|---|
| Misalignment (cm) | 0 | | | | 5* | | | |
| Separation (cm) | 1 | 2 | 3 | 4 | 1 | 2 | 3 | 4 |
| Coupling Factor (k) | 0.758 | 0.546 | 0.323 | 0.219 | 0.094 | 0.066 | 0.061 | 0.054 |

5*: This Misalignment was a half-way Misalignment, where the transmitter coil overlapped only by half of the receiver coil.

Example 6

This Examiner provides data on the effect of increasing the size of the receiver component's coil in order to establish stronger and more uniform magnetic field between wireless energy transmitter devices' coils and one large coil for the receiver component. The results of this Example clearly show the feasibility of transferring power from two wireless energy transmitter devices to a single receiver component.

In this Example, the receiver component's coil had a width that was twice the width of the wireless energy transmitter device's coil.

The solar cells provided an input voltage of 44 V. The Separation distance between the wireless energy transmitter devices coils and one large coil for the receiver component was 2 cm.

In this Example, it took 8 seconds from turning on the system to stablish a magnetic field and to start the power transfer. The resulting power output was 24 W. Based on the power input of 37 W from the wireless energy transmitter devices, the transfer power efficiency was determined to be 65%.

Example 7

This Examiner provides data on the effect of increasing the size of the receiver component's coil in order to establish stronger and more uniform magnetic field between wireless energy transmitter devices' coils and one large coil for the receiver component. In this Example, the receiver component's coil had a width that was three times the width of the wireless energy transmitter device's coil. This feature provided a more unified coupling and was more tolerant of the Misalignment than in Example 6.

Example 8

An example of a transmitter coil, which is a part of the wireless energy transmitter device (104, 108 shown in FIGS. 1, 2, and 5, also 204 shown in FIGS. 2 and 5), comprises a winding of wire. When current is provided through the transmitter coil, a magnetic field is generated. When an AC current runs through the transmitter coil, an alternating magnetic field is generated.

Example 9

Another example of a transmitter coil, which is a part of the wireless energy transmitter device (104, 108 shown in FIGS. 1, 2, and 5, also 204 shown in FIGS. 2 and 5), comprises a winding of wire surrounding at least one ferrite segment. The ferrite segment(s) aid in making the magnetic field more uniform when current is provided through the transmitter coil to generate the magnetic field. As in Example 8, when an AC current runs through the transmitter coil, an alternating magnetic field is generated, but the alternating magnetic field is more uniform than Example 8.

Example 10

An example of a receiver coil, which can be a part of the receiver component (110 shown in FIGS. 1, 2, and 5, also 502 shown in FIG. 5), comprises a winding of wire. When there is a magnetic field near the receiver coil, a current is generated through the receiver coil. When there is an alternating magnetic field near the receiver coil, an AC current is generated through the receiver coil.

Example 11

Another example of a receiver coil, which is a part of the receiver component (110 shown in FIGS. 1, 2, and 5, also 502 shown in FIG. 5), comprises a winding of wire surrounding at least one ferrite segment. The ferrite segment(s) reduces magnetic flux leakage in the backside of the receiver coil. When there is a magnetic field near the receiver coil, a current is generated through the receiver coil. When there is an alternating magnetic field near the receiver coil, an AC current is generated through the receiver coil.

Examples 9 and 11

When the exemplary transmitter coil according to Example 9 and the exemplary receiver coil according to Example 11 were implemented, the power transfer efficiency of 65% to 79% was achieved.

Example 12

An example of a transmitter coil or winding has the following form factor (see FIG. 7):

| | |
|---|---|
| Outside length 706: | 214 mm |
| Outside width 708: | 107 mm |
| Internal (keep-out) length 710: | 150 mm |
| Internal (keep-out) width 712: | 33.5 mm |
| Winding window width 714: | 33.5 mm |

Example 13

An example of a transmitter coil or winding has the following form factor (see FIG. 7):

| | |
|---|---|
| Outside length 706: | 321 mm |
| Outside width 708: | 107 mm |
| Internal (keep-out) length 710: | 257 mm |

-continued

| | |
|---|---|
| Internal (keep-out) width 712: | 33.5 mm |
| Winding window width 714: | 33.5 mm |

The terminology used herein is intended to describe embodiments and is not intended to be limiting. The terms "a," "an," and "the" include the plural forms as well, unless clearly indicated otherwise. The terms "comprises" and "comprising," when used in this disclosure, specify the presence of the stated features, integers, steps, operations, elements, components, or a combination thereof, but do not preclude the presence or addition of one or more other features, integers, steps, operations, elements, or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A roofing system, comprising:
- a roof structure including a roof deck;
- a first photovoltaic device disposed above the roof deck;
  - wherein the first photovoltaic device includes:
  - a first solar cell, and
  - a first wireless energy transmitter device comprising a first transmitter magnetic induction component,
  - wherein the first wireless energy transmitter device is electrically connected to the first solar cell, wherein the first wireless energy transmitter device is configured, when in operation, to generate a first alternating magnetic field;
- a second photovoltaic device disposed above the roof deck, wherein the second photovoltaic device includes:
  - a second solar cell, and
  - a second wireless energy transmitter device comprising a second transmitter magnetic induction component,
  - wherein the second wireless energy transmitter device is electrically connected to the second solar cell, wherein the second wireless energy transmitter device is configured, when in operation, to generate a second alternating magnetic field; and a wireless energy receiver device disposed below the roof deck,
  - wherein the wireless energy receiver device is not in direct electrical contact with the first photovoltaic device,
  - wherein the wireless energy receiver device is not in direct electrical contact with the second photovoltaic device,
  - wherein the wireless energy receiver device includes:
    - an electrical circuit, and
    - a magnetic induction component in electrical contact with the electrical circuit,
    - wherein an area of the magnetic induction component of the wireless energy receiver device is greater than a total area of the first and second transmitter magnetic induction components,
    - wherein the magnetic induction component is configured, when in operation, to be inductively coupled to both of the first wireless energy transmitter device and the second wireless energy transmitter device via the first alternating magnetic field and the second alternating magnetic field to alter a current through the electrical circuit,
- wherein the roofing system comprises one or more wireless energy receiver devices including the wireless energy receiver device and a plurality of wireless energy transmitter devices including the first and second wireless energy transmitter device, and wherein a quantity of the one or more wireless energy receiver devices is less than a quantity of the plurality of wireless energy transmitter devices.

2. The roofing system of claim 1, wherein the first photovoltaic device and the second photovoltaic device are not directly in electrical contact with each other.

3. The roofing system of claim 2, wherein the one or more wireless energy receiver devices further comprises additional wireless energy receiver devices.

4. The roofing system of claim 1, wherein the one or more wireless energy receiver devices comprises only one wireless energy receiver device.

5. The roofing system of claim 1, wherein the one or more wireless energy receiver devices further comprises additional wireless energy receiver devices.

6. The roofing system of claim 1, wherein the roof structure further comprises:
- a shingle; and
- an underlayment;
- wherein the underlayment is disposed between the shingle and the roof deck.

7. The roofing system of claim 6, wherein the wireless energy receiver device is disposed below the underlayment.

8. The roofing system of claim 1, wherein below the roof deck is in an attic of a building structure.

9. The roofing system of claim 1, wherein the first photovoltaic device further comprises an inverter configured, when in operation, to generate high frequency alternating current (AC).

10. The roofing system of claim 1, wherein the first photovoltaic device further comprises a resonant network of discrete or integrated components electrically connected to the first wireless energy transmitter device.

11. The roofing system of claim 1, wherein the electrical circuit of the wireless energy receiver device comprises a receiver resonant network of discrete or integrated components electrically connected to the magnetic induction component.

12. The roofing system of claim 1, wherein the first wireless energy transmitter device comprises:
- a resonant power converter;
- a capacitor, an inductor, or a combination thereof; and
- an inverter.

13. The roofing system of claim 1, wherein the first photovoltaic device is not connected electrically to a household appliance.

14. The roofing system of claim 1, the one or more wireless energy receiver devices each comprise a respective magnetic induction component including the magnetic induction component of the wireless energy receiver device, and wherein a quantity of the respective magnetic induction components is less than the quantity of the plurality of wireless energy transmitter devices.

15. The roofing system of claim 1, the roofing system comprises a plurality of solar cells including the first and second solar cells, and wherein the quantity of the one or more wireless energy receiver devices is less than a quantity of the plurality of solar cells.

16. The roofing system of claim 1, the roofing system comprises a plurality of solar cells including the first and second solar cells, the one or more wireless energy receiver devices each comprise a respective magnetic induction component including the magnetic induction component of the wireless energy receiver device, and wherein a quantity of the respective magnetic induction components is less than a quantity of the plurality of solar cells.

17. A roof system, comprising:

photovoltaic devices disposed above a roof deck, wherein the photovoltaic devices comprise:

two solar cells, and two wireless energy transmitter devices comprising respective transmitter magnetic induction components, wherein each of the two wireless energy transmitter devices are electrically connected to each of the two solar cells, respectively, and wherein the two wireless energy transmitter devices are configured, when in operation, to generate a magnetic field;

a wireless energy receiver device disposed below the roof deck, wherein the wireless energy receiver device is not in direct electrical contact with the two solar cells, wherein the wireless energy receiver device comprises:

an electrical circuit, and a magnetic induction component in electrical contact with the electrical circuit, wherein an area of the magnetic induction component of the wireless energy receiver device is greater than a total area of the transmitter magnetic induction components, wherein the magnetic induction component is configured, when in operation, to be inductively coupled to both of the two wireless energy transmitter devices via the magnetic field to alter a current through the electrical circuit, wherein the roof system comprises one or more wireless energy receiver devices including the wireless energy receiver device and a plurality of wireless energy transmitter devices including the two wireless energy transmitter devices, and wherein a quantity of the one or more wireless energy receiver devices is less than a quantity of the plurality of wireless energy transmitter devices.

18. A system, comprising:

solar cells;

wireless energy transmitter devices, comprising respective transmitter magnetic induction components, configured to be disposed above a roof deck, wherein the wireless energy transmitter devices are each electrically connected to the solar cells, respectively, wherein the wireless energy transmitter devices are configured, when in operation, to generate a magnetic field; and a wireless energy receiver device configured to be disposed below the roof deck, wherein the wireless energy receiver device is not in direct electrical contact with the solar cells, wherein the wireless energy receiver device includes:

an electrical circuit, and a magnetic induction component in electrical contact with the electrical circuit, wherein an area of the magnetic induction component of the wireless energy receiver device is greater than a total area of the transmitter magnetic induction components, wherein the magnetic induction component is configured, when in operation, to be inductively coupled to the wireless energy transmitter devices to alter a current through the electrical circuit, wherein the system comprises one or more wireless energy receiver devices including the wireless energy receiver device, and wherein a quantity of the one or more wireless energy receiver devices is less than a quantity of the wireless energy transmitter devices.

* * * * *